US012768741B2

(12) United States Patent
Waqar et al.

(10) Patent No.: US 12,768,741 B2
(45) Date of Patent: Oct. 20, 2026

(54) METHOD AND SYSTEM FOR DEFECT DETECTION

(71) Applicant: The Hong Kong University of Science and Technology, Hong Kong (CN)

(72) Inventors: Muhammad Waqar, Al-Khobar (SA); Moez Louati, Hong Kong (CN); Mohamed Salah Ghidaoui, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 449 days.

(21) Appl. No.: 18/503,240

(22) Filed: Nov. 7, 2023

(65) Prior Publication Data

US 2024/0201041 A1 Jun. 20, 2024

Related U.S. Application Data

(60) Provisional application No. 63/433,005, filed on Dec. 15, 2022.

(51) Int. Cl.
*G01M 3/28* (2006.01)
*G01M 3/24* (2006.01)
*G06F 17/14* (2006.01)

(52) U.S. Cl.
CPC ........... *G01M 3/2815* (2013.01); *G06F 17/14* (2013.01)

(58) Field of Classification Search
CPC ...... G01M 3/2815; G01M 3/243; G01M 3/28; G06F 17/14; G06F 17/153; G06F 17/18; G06F 2113/14; G06F 30/20; G06F 2110/10; G06F 2119/02; G01N 19/08; G01N 33/00
See application file for complete search history.

(56) References Cited

U.S. PATENT DOCUMENTS

2022/0011275 A1 1/2022 Bohorquez Arevalo et al.
2023/0017820 A1 * 1/2023 Burtea .................. G01N 29/50

FOREIGN PATENT DOCUMENTS

CN 103389339 A * 11/2013
CN 103389339 B 8/2015
CN 104034800 B 8/2016
CN 111256044 B 10/2021
WO WO-2017008098 A1 * 1/2017 ............ G01L 15/00

OTHER PUBLICATIONS

Muhammad Waqar et.al., Leak Localization Using Time Reversal Technique., 2019.9.1-6.
Muhammad Waqar et al., Time reversal of waves in pressurized pipelines., 2020.11.17-18, pp. 158-159.

* cited by examiner

*Primary Examiner* — Manuel L Barbee
(74) *Attorney, Agent, or Firm* — S&F/WEHRW

(57) ABSTRACT

A method of defect detection is provided for a pressurized pipe having an upstream node and a downstream node. The method comprises generating, by a wave source located at $x_S$ at the downstream node, a transient wave travelling in a direction from the downstream node towards the upstream node, measuring, by a pressure sensor located at $x_R$ upstream of the wave source, a transient response caused by the transient wave to obtain a measured signal; and processing, by a computer device to execute a time-reversal (TR) algorithm, the measured signal for determining one or more defects of the pressurized pipe.

15 Claims, 17 Drawing Sheets

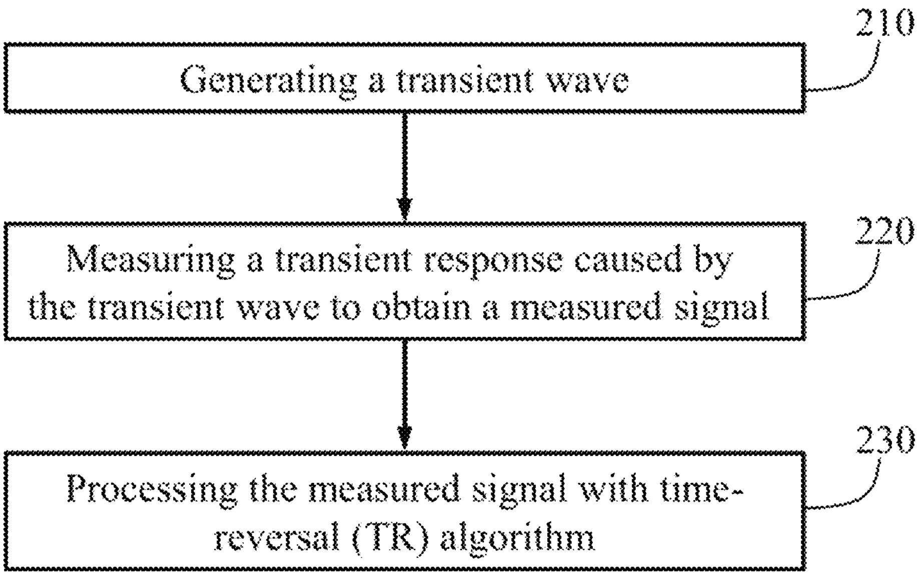

FIG. 2

310

Input: $\Delta h_m(x_R, t)$

Output: $B(\hat{x}_D), \hat{A}_D(\hat{x}_D)$

Steps:

1: $a_0 \leftarrow$ Eq. (1)

2: estimate $\lambda_{min} = a_0/f_{max}$

3: define $\Delta\hat{x}_D \leq 0.5\lambda_{min}$

4: define truncation point, $x_T$

5: define $t_R \in [0, 2x_T/a_0]$

6: $\Delta h_m(x_R, -t_R) \leftarrow \Delta h_m(x_R, t)$

7: for $\hat{x}_D \in \hat{X}_D = (\Delta\hat{x}_D, 2\Delta\hat{x}_D, \ldots, x_T)$ 8: | $B(\hat{x}_D) \leftarrow$ Eq. (2)

9: end

10: $\gamma \leftarrow$ Eq. (6)

11: $\underset{\hat{x}_D}{\arg\max}\, B(\hat{x}_D) := \{|B(\hat{x}_D)| > \gamma \mid \hat{x}_D \in \hat{X}_D, \hat{x}_D \notin \Omega_{BC}\}$ 12: $\hat{A}_D(\hat{x}_D) \leftarrow$ Eq. (8)

13: Run algorithm 320

FIG. 3A

Input: $\hat{A}_D(\hat{x}_D)$
Output: $\hat{s}_L$, $\hat{k}_B$
Steps:

```
if Â_D(x̂_D) < 0
    print "Defect is a leak"
    ŝ_L ← Eq. (9)
else
    print "Defect is a blockage"
    k̂_B ← Eq. (10)
end
```

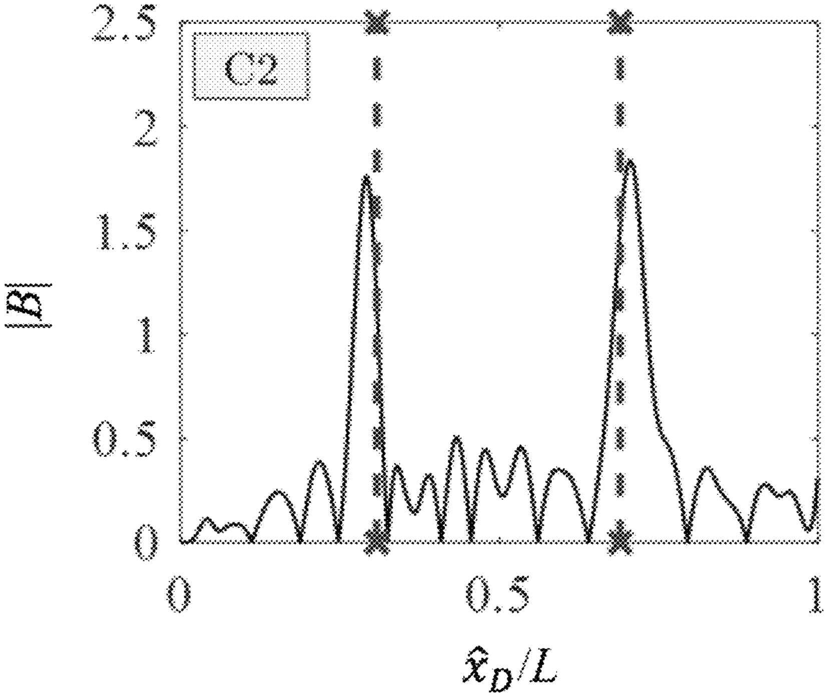
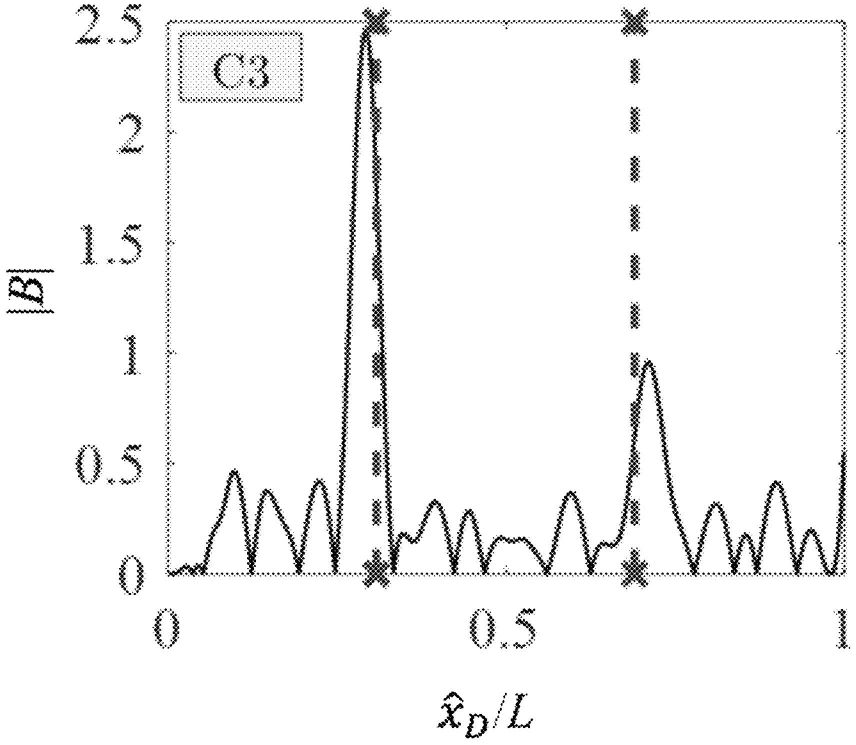
FIG. 6 (Continued)

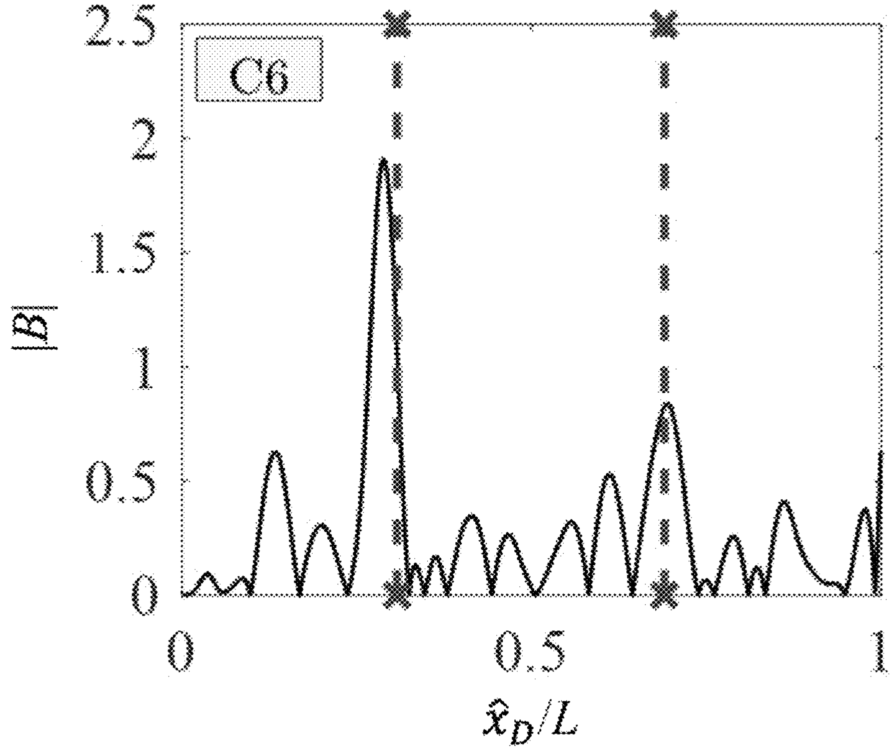
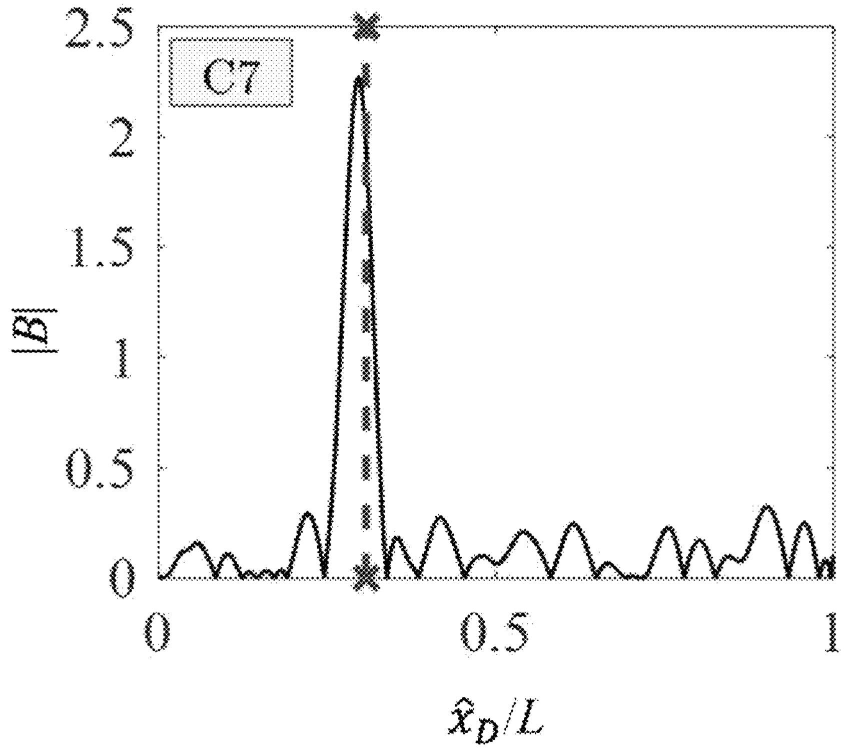
FIG. 6 (Continued)

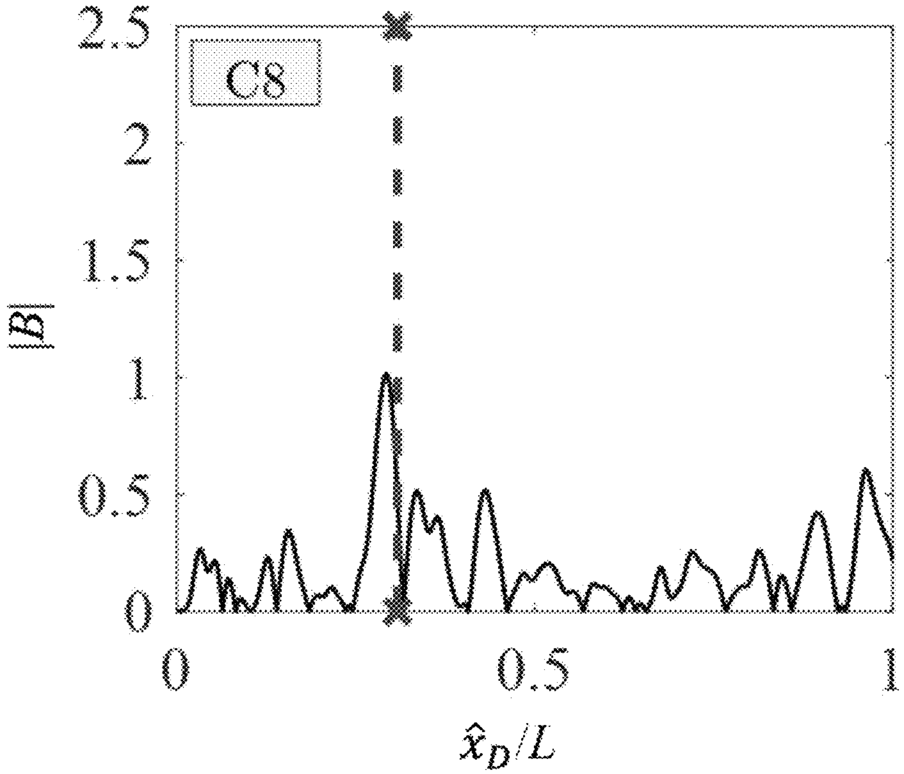
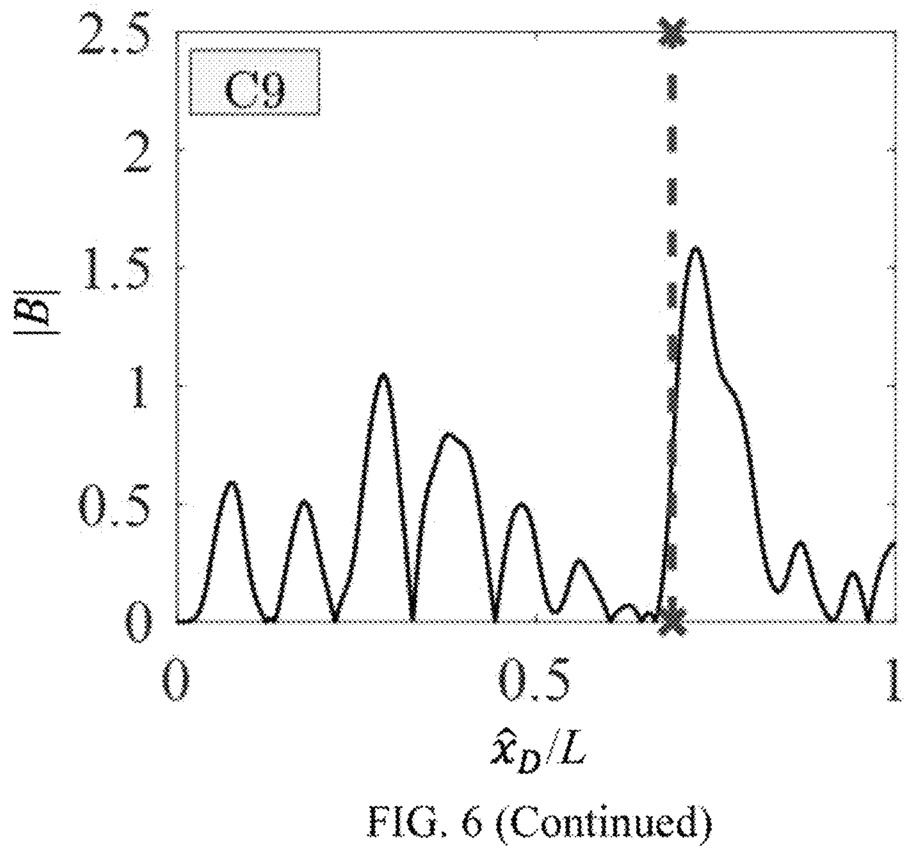
FIG. 6 (Continued)

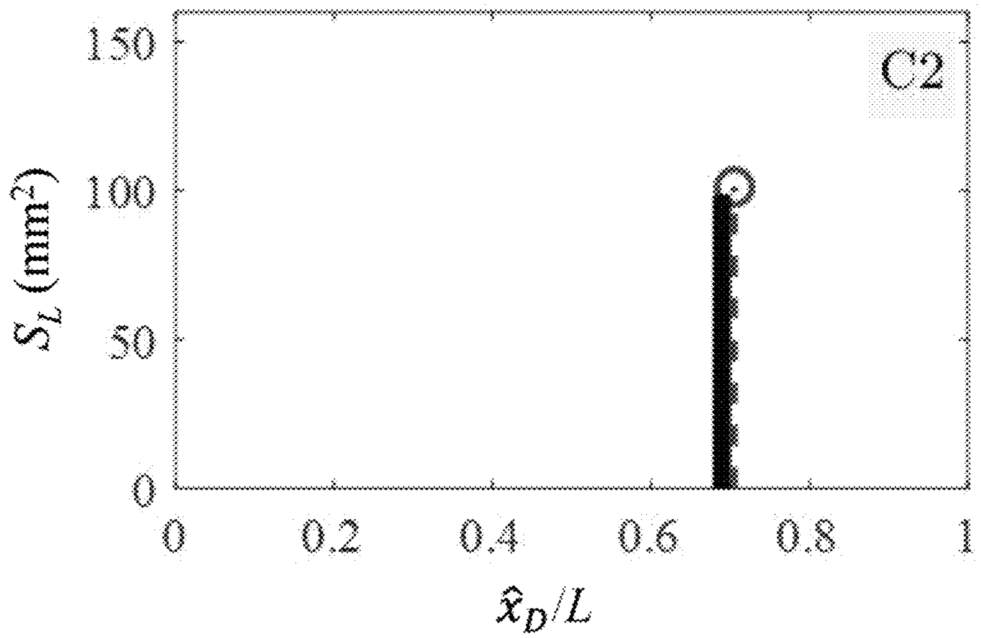
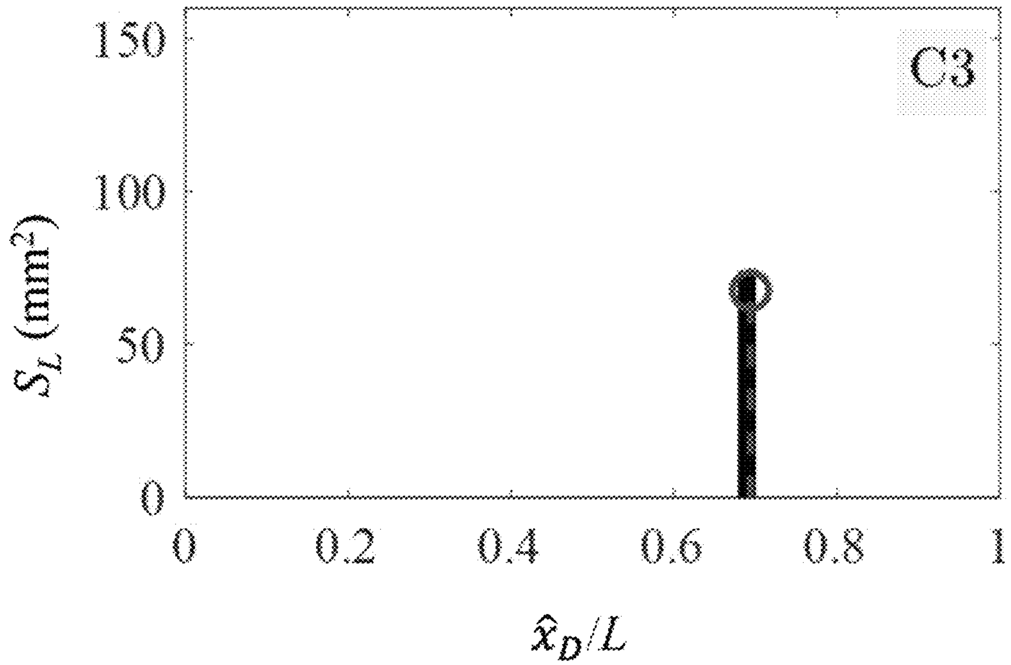
FIG. 7 (Continued)

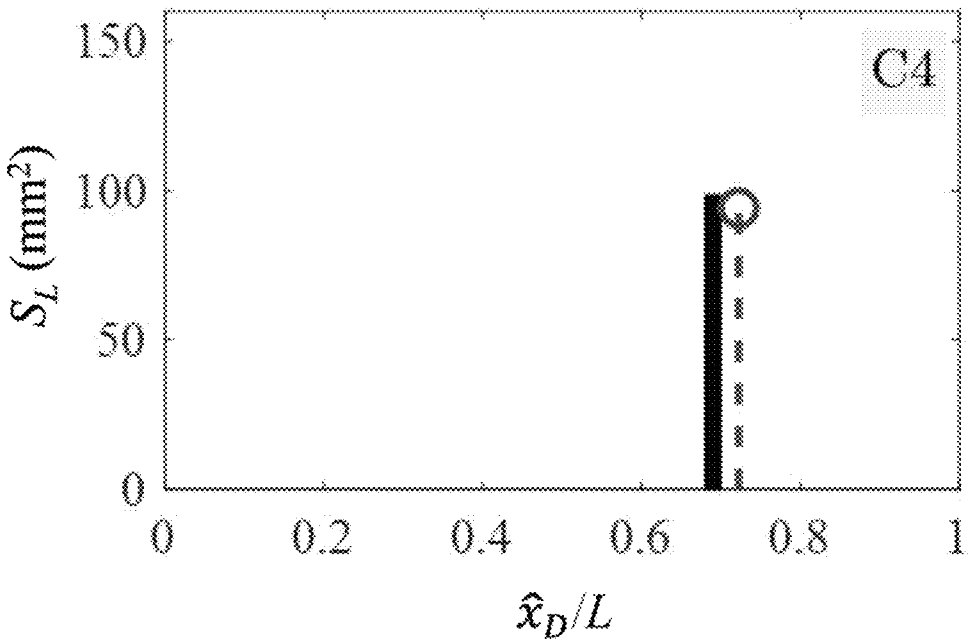
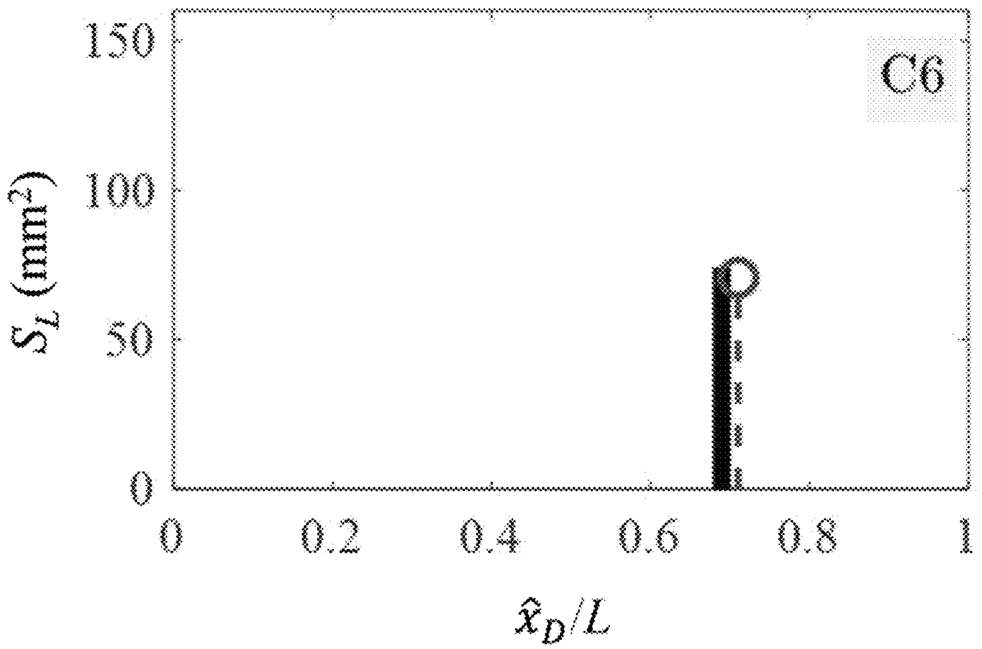
FIG. 7 (Continued)

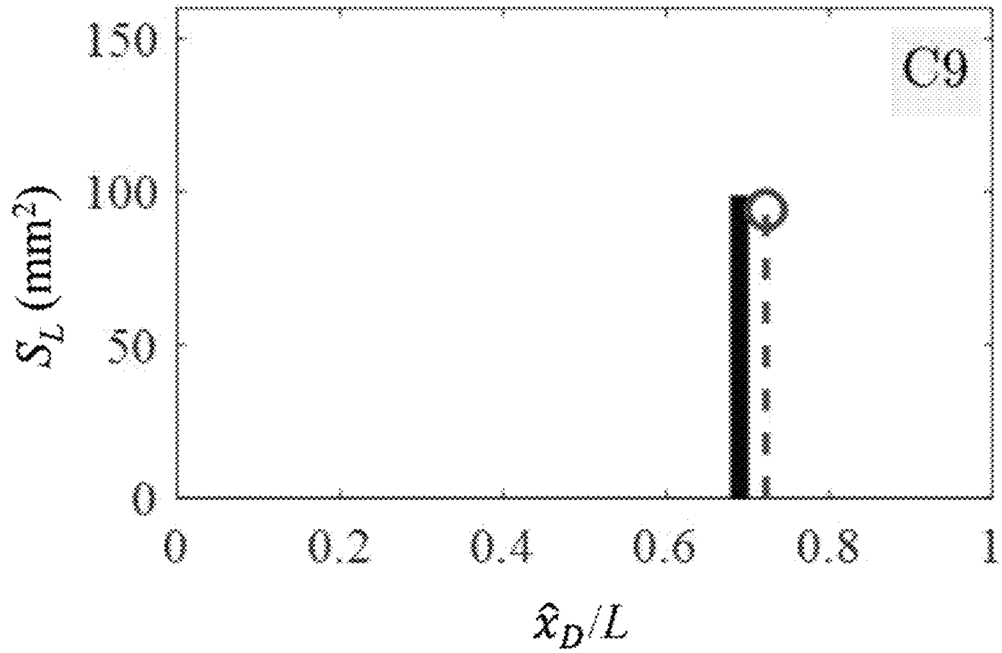
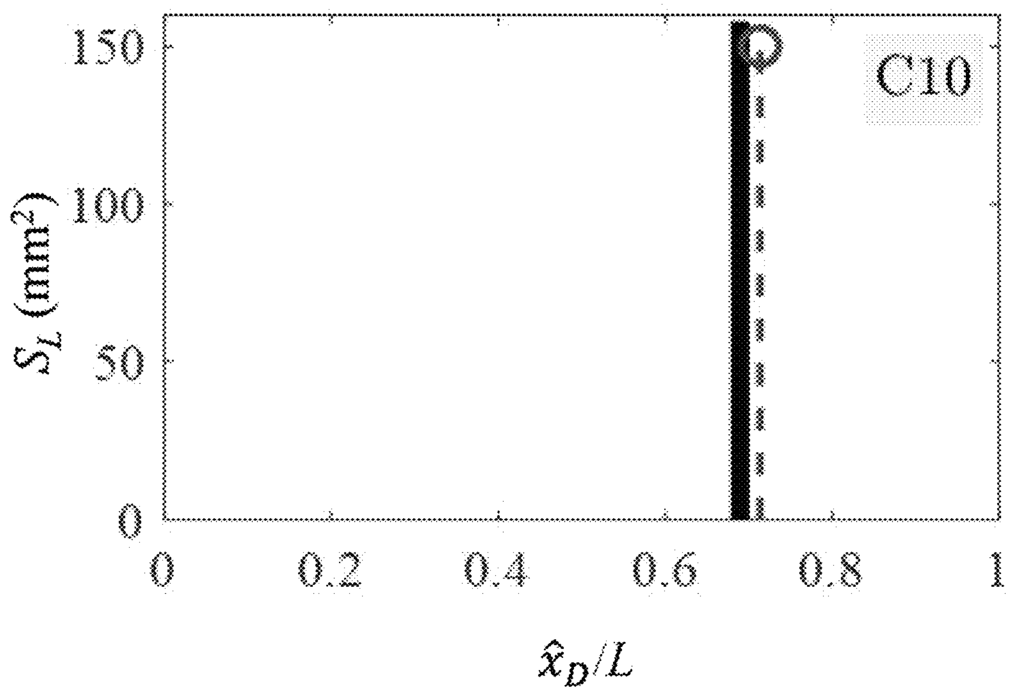
FIG. 7 (Continued)

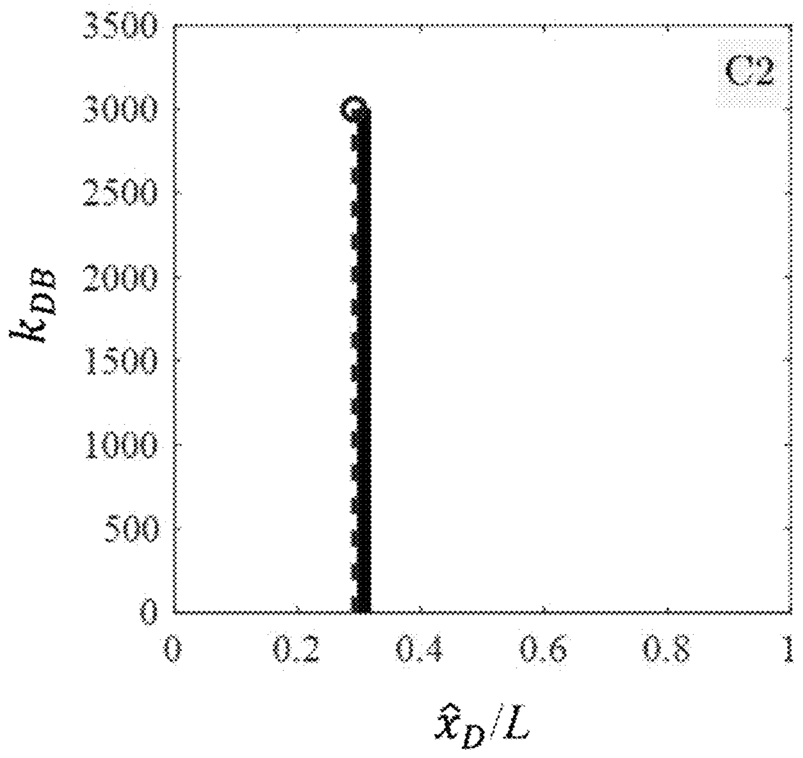
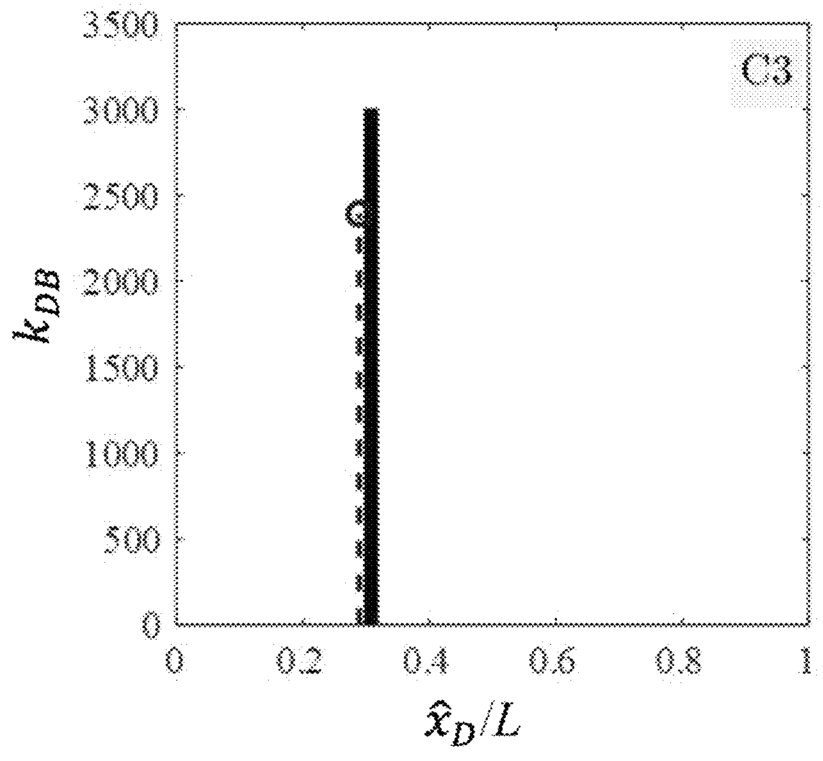
FIG. 8

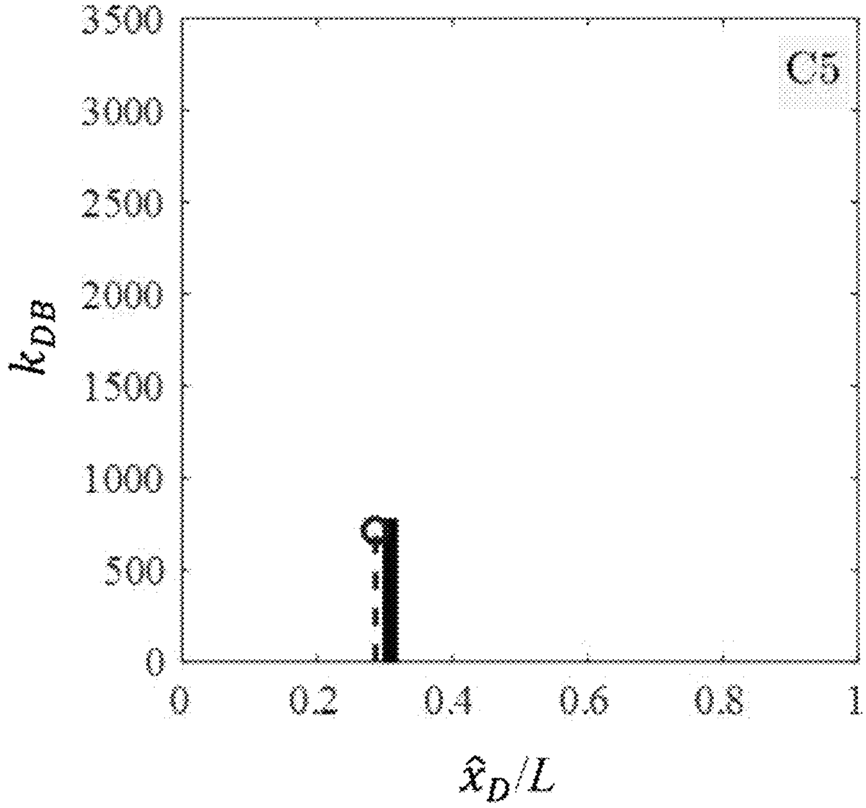
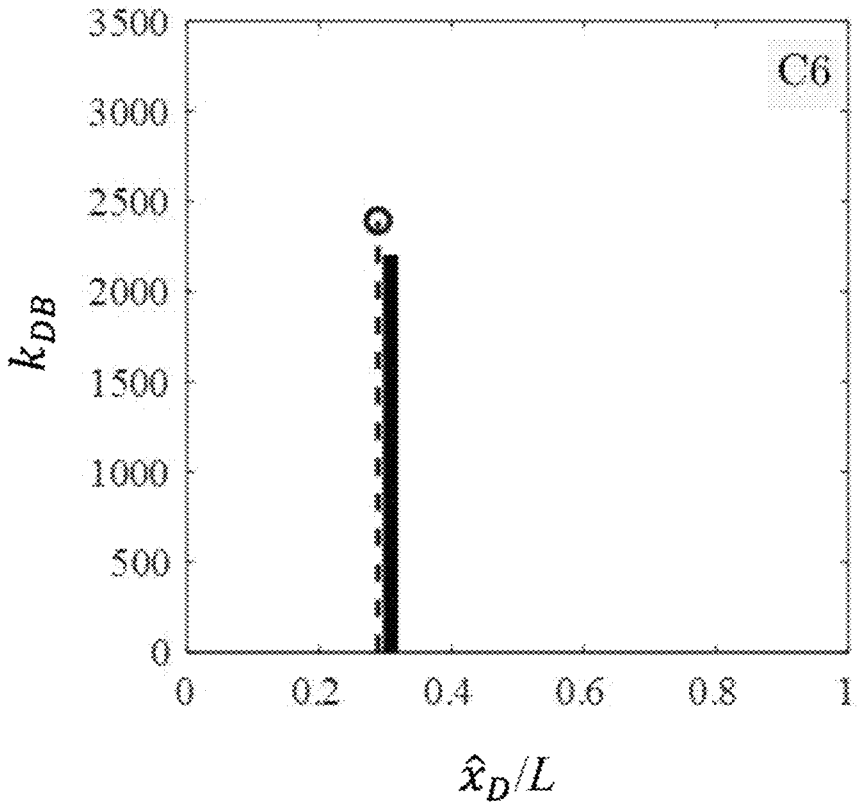
FIG. 8 (Continued)

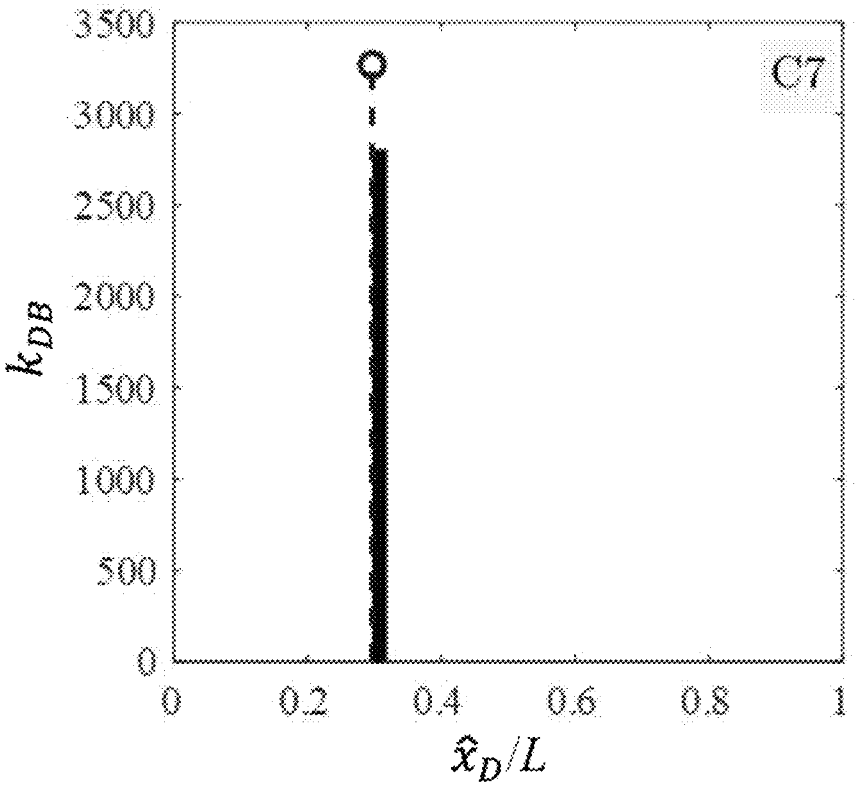
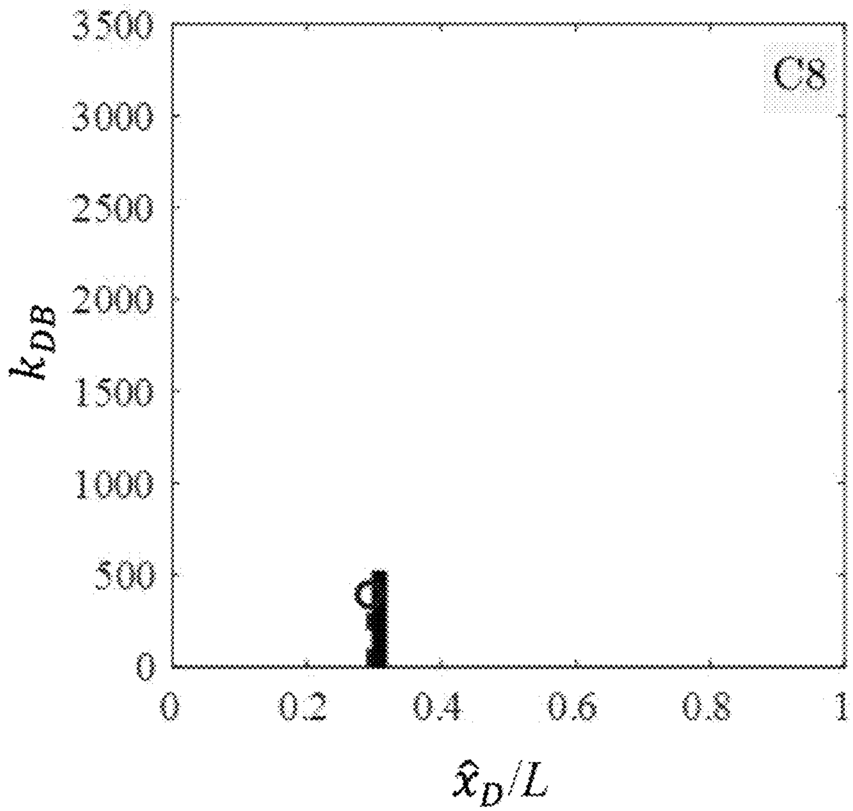
FIG. 8 (Continued)

METHOD AND SYSTEM FOR DEFECT DETECTION

CROSS-REFERENCE TO RELATED APPLICATIONS

This application claims priority to the U.S. provisional patent application Ser. No. 63/433,005 filed Dec. 15, 2022, entitled "Time-Reversal Technique for Defect Detection in Pressurized Pipelines", hereby incorporated herein by reference as to its entirety.

FIELD OF THE INVENTION

The present disclosure generally relates to defect detection, and more particularly to detecting defects in a pipeline system carrying a fluid.

BACKGROUND

The out-of-sight and poorly accessible water-supply pipes or pipelines in urban cities are susceptible to defects such as leaks and blockages within their life expectancy. Leaks in pipelines are a potential source of contamination and also result in a tremendous waste of scarce resources, such as water. Blockages cause waste of energy as a blocked pipe requires more energy to supply the same amount of water needed from a blockage-free pipe. It is reported that leaks and bursts result in 129 billion $m^3$ of fresh or potable water loss every year worldwide, which is enough to supply 130 cities like Hong Kong, at a direct cost of more than US$39 billion per year. The energy used to treat, transport, and pump this amount of lost water is staggering and leaves a significant carbon footprint. In 2021, the American Society of Civil Engineers (ASCE) rated America's freshwater pipeline infrastructures a "C-" grade. To control these huge losses, the development of defect detection technologies is the pragmatic solution recommended by almost all water-concerning organizations such as UNESCO, Asian Development Bank, and American Water Works Association. The global state of water supply systems indicates that the existing technologies are inefficient or unsatisfactory to curb the losses and resolve pipeline health-related issues.

It is an object of the present disclosure to overcome or substantially ameliorate one or more of the disadvantages of prior art, or at least to provide a useful alternative.

SUMMARY

In one aspect of the present disclosure there is provided a method of defect detection for a pressurized pipe having an upstream node and a downstream node. The method comprises: generating, by a wave source located at $x_S$ at the downstream node, a transient wave travelling in a direction from the downstream node towards the upstream node; measuring, by a pressure sensor located at $x_R$ upstream of the wave source, a transient response caused by the transient wave to obtain a measured signal; and processing, by a computer device to execute a time-reversal (TR) algorithm, the measured signal for determining one or more defects of the pressurized pipe.

In another aspect of the present disclosure there is provided a system of defect detection for a pressurized pipe having an upstream node and a downstream node. A wave source is located at $x_S$ at the downstream node and configured to generate a transient wave travelling in a direction from the downstream node towards the upstream node. The system comprises a pressure sensor and a computer device. The pressure sensor is located at $x_R$ proximate to and upstream of the wave source and configured to measure the transient wave to obtain a measured signal. The computer device is configured to control the pressure sensor and to execute a process comprising: receiving the measured signal from the pressure sensor; truncating the measured signal at a truncation point located at $x_T$ along the pressurized pipe to obtain a truncated signal denoted as $\Delta h_m(t_R)$; reversing the truncated signal in time domain to obtain a time-reversed signal denoted as $\Delta h_m(-t_R)$; computing an objective function given by $$B(\hat{x}_D) = \left[\frac{g_C(t_R, \hat{x}_D)}{\|g_C(c_R\hat{x}_D)\|} * \Delta h_m(-t_R, x_D)\right]_{t_R=0};$$

and determining defect location by computing $$\hat{x}_D = \arg\max_{\hat{x}_D} B(\hat{x}_D) := \left\{|B(\hat{x}_D)| > \gamma \,\middle|\, \hat{x}_D \in \hat{X}_D, \hat{x}_D \notin \Omega_{BC}\right\}.$$

$t_R$ is a variable and $t_R \in [0, 2x_T/a_0]$. $a_0$ denotes wave speed. $\hat{X}_D=(\Delta\hat{x}_D, 2\Delta\hat{x}_D, \ldots, x_T)$ is a vector for potential defect locations. $\Delta\hat{x}_D \le 0.5\lambda_{min}$. $\lambda_{min}=a_0/f_{max}$. $f_{max}$ is a maximal frequency of the transient wave. $x_D$ is a true vector of defect locations. $g_C(t_R, \hat{x}_D)$ is a preset model response. * represents a convolution operator. $[\bullet]_{t_R=0}$ represents a function $[\bullet]$ evaluated at $t_R=0$. $\|\bullet\|$ represents Euclidean norm of a function.

$$\gamma = \max\left(\left[n(t_R) \otimes \frac{g_C(t_R, \hat{x}_D)}{\|g_C(t_R, \hat{x}_D)\|}\right](t_R = 0)\right) \cdot [n \otimes g](t_R = 0)$$

denotes cross-correlation between n and g evaluated at $t_R=0$. $\Omega_{BC}$ denotes a set of known locations of boundaries.

In a further aspect of the present disclosure there is provided a computer-implemented method of defect detection for a pressurized pipe having an upstream node and a downstream node. A wave source is located at $x_S$ at the downstream node and configured to generate a transient wave travelling in a direction from the downstream node towards the upstream node. A pressure sensor is located at $x_R$ upstream of the wave source and configured to measure the transient wave to obtain a measured signal. The method comprises: receiving the measured signal from the pressure sensor; truncating the measured signal at a virtual truncation point located at $x_T$ along the pressurized pipe to obtain a truncated signal; reversing the truncated signal in time domain to obtain a time-reversed signal; computing an objective function by performing a convolution operation between the time-reversed signal and a preset model response; and estimating defect location based on one or more lobes of the objective function.

Other example embodiments are discussed herein.

BRIEF DESCRIPTION OF THE DRAWINGS

Embodiments of the present disclosure will now be described, by way of example only, with reference to the accompanying drawings in which:

FIG. 2 illustrates a method of defect detection for a pressurized pipe according to certain embodiments of the present disclosure.

FIG. 3A shows an algorithm for defect localization according to certain embodiments of the present disclosure.

FIG. 8 shows estimated discrete blockage location and coefficients for the test cases C2, C3, C5-C8 in the test scheme of FIG. 5.

DETAILED DESCRIPTION

Figure 1:
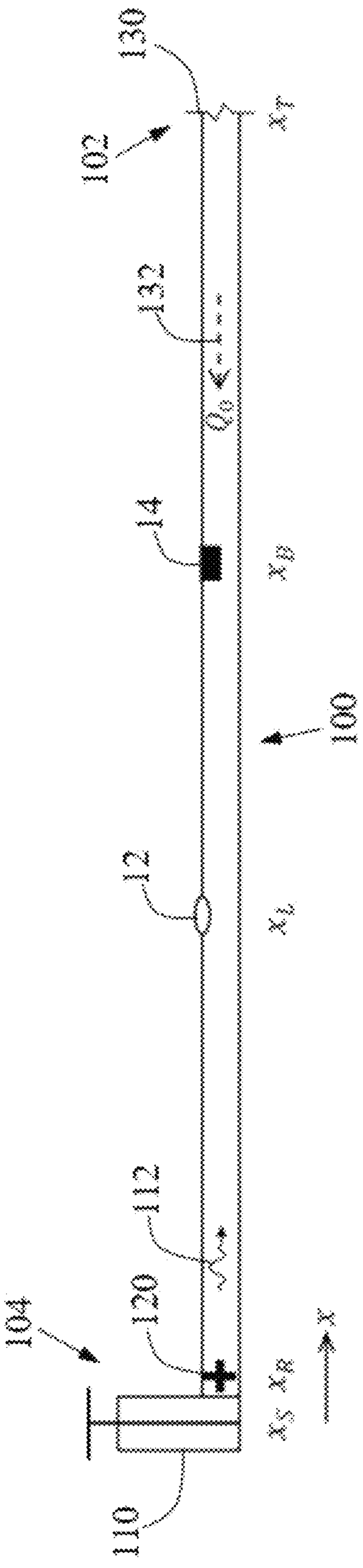
FIG. 1 illustrates a pipeline model used for developing defect detection algorithms according to certain embodiments of the present disclosure.

The present disclosure will now be described with reference to the following examples which should be considered in all respects as illustrative and non-restrictive. In the Figures, corresponding features within the same embodiment or common to different embodiments may have been given the same or similar reference numerals.

Throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", etc., to describe a common object, merely indicate that different instances of like objects are being referred to, and are not intended to imply that the objects so described must be in a given sequence, either temporally, spatially, in ranking, or in any other manner.

Example embodiments relate to method and system for defect detection that enable an efficient identification of defects in a pipeline system.

Many existing technologies attempt to detect defects in a pipeline system. One technology is transient wave-based defect detection methods (TBDDMs). However, those existing methods are restricted to be applicable to signals with large signal-to-noise ratio (SNR). Moreover, many of those TBDDM methods are either not scalable and/or computationally expensive.

Example embodiments solve one or more of these problems and provide a technical solution with improved accuracy and reduced cost. According to one or more embodiments, a novel defect detection technique is provided. This technique utilizes and develops the time-reversal (TR) technique as a tool for pipeline defect detection. According to the wave TR principle, transient waves can follow their past steps and focus on their source when reversed (flipped) in time domain and rebroadcasted into the medium. This unique property of transient waves is exploited, where the recorded hydraulic transient signal is time-reversed and rebroadcasted into a model (e.g., a theoretical or numerical model) to identify locations of the defects.

The technique as described herein according to one or more embodiments is applicable to a pressurized pipe. The TR-based technique involves a forward step where transient waves are generated in a pipeline system and then sensed by one or more pressure sensors. This is followed by a backpropagation step where the chronological order of the sensed waves is reversed and re-emitted into a model where the sensed waves are processed for obtaining various information of defects in the pressurized pipe. According to some embodiments, the backpropagation step can be a convolution between a time-reversed response and a simulated model response or modeled response. The output of this convolution is based on an objective function that maximizes SNR.

According to one or more embodiments, the technique as described herein is formulated such that the signal sensed by the pressure sensor can be truncated to eliminate undesirable reflections from unknown or uncertain parts of the pipeline system without compromising the accuracy and robustness of the detection.

The technique described herein according to one or more embodiments has been validated through extensive laboratory experiments and tested on real-field data. The technique has been demonstrated to be statistically optimal (such as in maximizing SNR). When the measured signal is reversed in time and convolved with the modeled response, it has the same effect of a filter in signal processing, thereby the time reversal operation becomes a matched filter that maximizes the SNR. As demonstrated below, the technique is able to provide robust and accurate results for SNR as low as 0 dB.

The technique described herein according to one or more embodiments makes it possible to identify simultaneously diverse multiple defects (e.g., leaks and blockages) without prior knowledge of defect information, such as number of defects, defect type, size, etc.

According to one or more embodiments, the technique possess one or more of advantages, including but not limited to, (i) being physics-based and not requiring gradient-based optimization procedures, (ii) statistically optimal in maximizing SNR and providing robust and accurate results for SNR as low as 0 dB, (iii) attaining the maximum possible resolution that is defined by the diffraction limit of waves, (iv) computationally inexpensive, (v) working better over the existing technique, and the improved performance becomes prominent particularly when complexity of the pipeline system increases, and (vi) offering higher tolerance against modelling errors (e.g., wave speed uncertainty, background flowrate, etc.).

FIG. 1 illustrates a pipeline model used for developing defect detection algorithms according to certain embodiments of the present disclosure. In this model, a pipe 100 is pressurized with a fluid 132 (such as water, oil, or gas, or a mixture of liquid and gas) flowing from an upstream node 102 to a downstream node 104. Note that the pipe 100 as shown in FIG. 1 may be a part of a pipe rather than a whole pipe. The terms "upstream" and "downstream" merely indicate the relative position of the two nodes 102 and 104. That is, the node 102 is at the upstream of the node 104 in terms of the direction of fluid flowing. The fluid 132 flows within the pipe 100 at a flowrate $Q_0$. The flowrate may be constant and maintained at the upstream node 102 by, e.g., connecting the upstream node 102 to a reservoir, a tank or a centrifugal pump. The flowrate may vary through a manual or automated control.

The pipe 100 may have one or more defects, such as one or more leaks or blockages, that will undesirably compromise the performance of fluid transportation. In a real-world pipeline system, the information of the defects, such as number, location, type, size, etc., is generally unknown and needs to be identified. For purpose of illustrating the defect detection algorithms, FIG. 1 shows a leak 12 located at $x_L$ and a blockage 14 located at $x_B$. The leak 12 allows the fluid 132 to leak out of the pipe 100, while the blockage 14 blocks or resists fluid flowing.

Further, a wave source in the form of a valve 110 is located at $x_S$ at the downstream node 104. The valve 110 can be operated to generate a transient wave 112 (in some embodiments, the transient wave may be called an injected wave or injected pressure wave) travelling in a direction (i.e., x direction) from the downstream node 104 towards the upstream end 102. For example, the valve 110 may be suddenly closed for a predetermined closing duration to produce the transient wave 112 propagating along the x direction, causing a transient response or discharging to occur along the pipe 100. For example, the generated transient wave may be a step wave in general and is not classified as an impulse wave. Further, a pressure sensor 120 (denoted by "+") is located at $x_R$ upstream (i.e., compared to the valve 110, the pressure sensor 120 is closer to the upstream node 102) of the valve 110 such that the pressure sensor 120 is located on the propagation path of the transient wave 112 and measures the transient response to obtain a measured signal. In the present embodiment, the location of $x_R$ is proximate to the location of $x_S$, despite in some other embodiments the two locations may be disposed further away. The measured signal can be fed into a model (e.g., a theoretical or numerical model) to obtain defect information. Note that in the present embodiment, for simplicity and without compromising generality, the pipeline model is illustrated as a one-dimensional model, where the positive direction of x coordinate is shown in FIG. 1 and the measurement location of the pressure sensor 120 is taken as an origin such that $x_R=0$. In some other embodiments, the coordinate system may be placed differently and the origin can be in a different location.

A truncation point 130 is specified at a location $x_T$ in the pipe 100 such that the measured signal is truncated at time $t=2x_T/a_0$, where $a_0$ denotes wave speed. The truncation point 130 is a virtual point and the signal truncation is performed in the model. Albeit the truncation point 130 as illustrated is at or proximate to the upstream node 102, this is not necessary. Theoretically, the truncation point can be arbitrarily selected.

Figures 3B, 4:
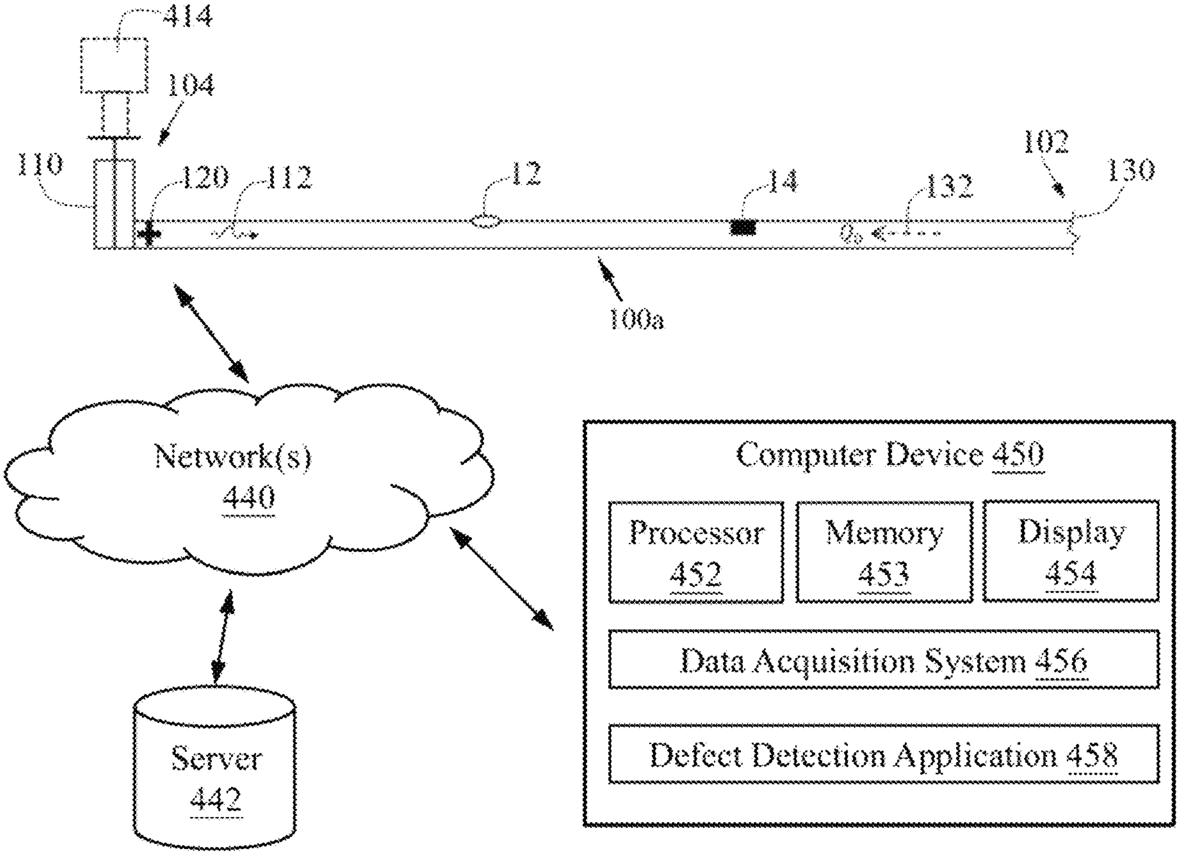
FIG. 3B shows an algorithm for defect type identification and corresponding size estimation according to certain embodiments of the present disclosure.
FIG. 4 illustrates a system of defect detection for a pressurized pipe according to certain embodiments of the present disclosure.

FIGS. 2, 3A and 3B illustrate methods and algorithms for detecting the leak 12 and blockage 14 in the pipe 100. Referring to FIG. 2, Block 210 states generating a transient wave or injected pressure wave. The transient wave may be created via various means or operations, such as through valve maneuver, pump shutdown/startup, etc. The transient wave may be created by a rapid closure of the valve 110. The transient wave propagates in the fluid in the pipe and interacts with physical features of the pipeline system. The physical features may include junctions, in-line devices, nodes, dead ends, or various other appurtenances that are physically present and may influence the flow field in the pipeline system. Block 220 states measuring a transient response caused by the transient wave to obtain a measured signal. The measured signal is a signal in time domain. Block 230 states processing the measured signal with a TR algorithm. The TR algorithm may comprise algorithms 310 and 320 as shown in FIGS. 3A and 3B respectively. The measured signal can be transmitted to a computer device implementing with algorithms 310 and 320 and is processed therein.

According to certain embodiments, the wave speed may be given by (see Wylie, E. B., Streeter, V. L., and Suo, L. (1993). Fluid transients in systems, Vol. 1. Prentice Hall Englewood Cliffs, NJ., "Wylie 1993" hereinafter):

$$a_0 = \left(\frac{\rho}{K} + (1 - \nu^2)\frac{\rho D}{eE}\right)^{-1/2} \quad (1)$$

where ρ is density of the fluid in the pipe, K is bulk modulus of the fluid, ν is Poisson's ratio, D is inner diameter of the pipe, e is thickness of the wall of the pipe (or called pipe wall), and E is modulus of elasticity of the pipe. In practice, two measurement locations or a reflection from a known boundary in the pipe system may be used to confirm or calibrate the wave speed.

According to certain embodiments, the measured signal may be denoted as $H_m(t, x_R)$, which indicates the signal is measured at the location $x_R$ at time t, and the index m indicates the signal is a measured signal. The measured signal may be truncated at the truncation point located at $x_T$ to obtain a truncated signal. Specifically, the pre-transient part of the measured signal can be truncated and then the mean of the pre-transient pressure head is subtracted to obtain $h_m(t)$. The pre-transient pressure head refers to the pressure in the pipe 100 before the transient wave is generated. The incident (injected) wave signature is then subtracted from $h_m(t)$. The resulting signal is denoted by $\Delta h_m(t)$.

Based on the truncation point $x_T$, $\Delta h_m(t_R)$ can be extracted from $\Delta h_m(t)$, where $t_R \in [0, 2x_T/a_0]$. $\Delta h_m(t_R)$ is then reversed or flipped in time domain to obtain $\Delta h_m(-t_R)$. Define a vector for potential defect locations as $\hat{X}_D=(\Delta\hat{x}_D, 2\Delta\hat{x}_D, \ldots, x_T)$, where $\Delta\hat{x}_D \le 0.5\lambda_{min}$, $\lambda_{min}=a_0/f_{max}$, and $f_{max}$ is a maximum frequency of the transient wave.

For each $\hat{x}_D \in \hat{X}_D$, an objective function $B(\hat{x}_D)$ is defined as $$B(\hat{x}_D) = \left[\frac{g_C(t_R, \hat{x}_D)}{\|g_C(t_R, \hat{x}_D)\|} * \Delta h_m(-t_R, x_D)\right]_{t_R=0} \quad (2)$$

where $x_D$ is the true vector of defect locations, * represents a convolution operator, $[\bullet]_{t_R=0}$ represents the function $[\bullet]$ evaluated at $t_R=0$, $\|\bullet\|$ represents Euclidean norm of a function, and $g_C(t_R, \hat{x}_D)$ is a preset model response or modelled response. The model response may be obtained from a numerical model, such as a transient model based on method of characteristics (MOC) (see Wylie 1993). Alternatively, the model response may be based on a closed-form analytical solution of a wave equation. For example, for a single pipe, the closed-form analytical model for $g_C(t, \hat{x}_D)$ is given by $$g_C(t, \hat{x}_D) = q_{in}(t) * G(t, \hat{x}_D) \quad (3)$$

where $q_{in}(t)$ is a non-dimensional pulse-type function, whose maximum amplitude can be equal to Joukowsky's pressure head (see Wylie 1993), and $G(t, \hat{x}_D)$ is a propagation function.

In some embodiments, for convenience, the damping effect (e.g., unsteady friction and viscoelastic effects) in an analytical model is accounted for using the propagation function in the frequency domain. For a single (unbounded) pipe system, the propagation function is given by $$F[G(t, \hat{x}_D)](\omega) = \tilde{G}(\omega, \hat{x}_D) = \exp(-2ik(\hat{x}_D - x_S))\exp(ik(x_R - x_S)) \quad (4)$$

where F[•](ω) denotes Fourier transform operator, $\tilde{G}(\omega)$ is Fourier transform of G(t) from time domain to frequency domain, $x_S$ is the wave source location, $x_R$ is sensor placement location, i is imaginary number, and k is wavenumber given by $$k = \sqrt{\frac{\omega^2}{a_{ve}^2} - \frac{i\omega}{a_{ve}^2}R + \frac{\omega^2}{a_{ve}^2}\hat{R}(\omega)} \quad (5)$$

where $a_{ve}$ is frequency-dependent wave speed (e.g., defined in Wang, X., Lin, J., Keramat, A., Ghidaoui, M. S., Meniconi, S., and Brunone, B. (2019). "Matched-field processing for leak localization in a viscoelastic pipe: An experimental study." Mechanical Systems and Signal Processing, 124, 459-478; Waqar, M., Louati, M., Wang, X., & Ghidaoui, M. S. (2021). Model-Free Matched Field Processing for Condition Assessment of Pressurized Pipes. Journal of Water Resources Planning and Management, 147(10), 04021066 ("Waqar 2021" hereinafter)) that may account for the effect viscoelasticity of polymeric pipes. $R=f_{DW}Q_0/(DA)$ accounts for linearized steady friction, where $f_{DW}$ is the Darcy-Weisbach friction factor, $Q_0$ is the flowrate in the pipe before the transient wave is generated, D is inner diameter of the pipe, A is a cross-sectional area of the pipe, and $\hat{R}(\omega)$ is a frequency-dependent wall shear stress model, which accounts for unsteady friction model (see Waqar 2021). The model is transformed back into the time domain using the inverse Fourier transform. For the case where a numerical model is used, $g_C(t, \hat{x}_D)$ becomes the numerically simulated transient response of the system for different $\hat{x}_D \in \hat{X}_D$.

The objective function $|B(\hat{x}_D)|$ includes lobes (peaks) that correspond to three types: (i) existing scatterers such as boundaries, such as ends, junctions, etc. (ii) defects and (iii) noise. The lobes corresponding to the first type are known because the locations of system boundaries are known. To improve the detection of the defects, the lobes caused by noise can be filtered. In doing so, a threshold γ such that $|B(\hat{x}_D)|>\gamma$ is first considered to isolate the physical lobes from those caused by noise. The threshold is defined as $$\gamma = \max\left(\left[n(t_R) \otimes \frac{g_C(t_R, \hat{x}_D)}{\|g_C(t_R, \hat{x}_D)\|}\right](t_R = 0)\right) \quad (6)$$

where $[n \otimes g](t_R=0)$ denotes cross-correlation between n and g evaluated at $t_R=0$. Then, known scatterers in the pipeline system are identified (knowing the layout of the system). The remaining lobes indicate the estimated defect locations. Mathematically, the identified lobes for estimated defects are defined as $$\hat{x}_D = \underset{\hat{x}_D}{\arg\max}(\hat{x}_D) := \{|B(\hat{x}_D)| > \gamma \mid \hat{x}_D \in \hat{X}_D, \hat{x}_D \notin \Omega_{BC}\} \quad (7)$$

where $\Omega_{BC}$ denotes a set of known locations of system boundaries.

For each potential defect candidate $\hat{x}_D$, the amplitude of the reflected signal is determined as $$\hat{A}_D(\hat{x}_D) = \frac{\langle \tilde{g}_C(\omega, \hat{x}_D), \Delta\tilde{h}_m(\omega, x_D, A_D)\rangle}{\langle \tilde{g}_C(\omega, \hat{x}_D), \tilde{g}_C(\omega, \hat{x}_D)\rangle} \quad (8)$$

where $\tilde{g}_C(\omega)$ is the Fourier transform of $g_C(t)$, ⟨•,•⟩ denotes the inner product between two vectors, $\hat{A}_D$ is an estimate of $A_D$, and $\Delta\tilde{h}_m$ is Fourier transform of $\Delta h_m(t)$.

Considering a generated positive pulse wave, a positive sign of $\hat{A}_D$ implies that the reflector is an in-line local damper (e.g., blockage) which is characterized by its head-loss coefficient $\hat{k}_B$. On the other hand, a negative sign of $\hat{A}_D$ represents a local relief point (e.g., a leak) that is characterized by its area $\hat{s}_L$. The estimation for $\hat{k}_B$ and $\hat{s}_L$ can be made using the following expressions respectively:

$$\hat{S}_L = \frac{4\hat{A}_D(gA)^2}{a_0(a_0\tilde{q}_S - gA\hat{A}_D)}\sqrt{\frac{H_0(\hat{x}_D)}{2g}} \quad (9)$$

$$\hat{k}_B = \frac{2gA^2a_0\hat{A}_D}{Q_0(a_0\tilde{q}_s - gA\hat{A}_D)} \quad (10)$$

where $\tilde{q}_S=1$, $H_0(\hat{x}_D)$ is steady-state pressure head at the location $\hat{x}_D$, and g is the gravitational acceleration constant. The steady-state pressure head at the leak location can be estimated using $$H_0(\hat{x}_D) = H_0(x_R) + \hat{x}_D\frac{RQ_0}{2gA} \quad (11)$$

The example algorithms are shown in FIGS. 3A and 3B, where algorithm 310 is used for defect localization, and algorithm 320 is used for defect classification and size estimation. Despite the above example is described where signal truncation is performed on the measured signal, it will be appreciated that this is not essential, but only preferred considering the signal truncation can eliminate undesirable reflections from unknown or uncertain parts of the pipeline system.

FIG. 4 illustrates a system of defect detection for a pressurized pipe **100*a* according to certain embodiments of the present disclosure. Configuration of the pipe 100*a* can be same or similar as that of the pipe 100. The valve 110, as an example of a wave source and when actuated, generates a transient wave 112**.

The defect detection system comprises a pressure sensor 120 to capture the transient response by obtaining a measured signal. The system further comprises a computer device 450 that processes the measured signal received from the pressure sensor 120 for detecting defects, such as the leak 12 and blockage 14.

The computer device 450 comprises a processor or processing unit 452 (such as one or more processors, microprocessors, and/or microcontrollers), one or more components of computer readable medium or memory 453, one or more displays 454, a data acquisition system 456 and a defect detection application 458. The computer device 450 can execute a method discussed herein and/or one or more blocks discussed herein and display results (such as number, location, type, size of defects as well as other parameters of a pressurized pipe) for review. For example, the data acquisition system 456 communicates with the pressure sensor 120 for acquiring the measured signal representing the transient response. The defect detection application 458 comprises various algorithms, such as TR algorithms comprising algorithms 310 and 320, that when executed by the processor 452, determining various defect information.

By way of example, the computer device 450 receives the measured signal from pressure sensor 120, truncates the measured signal at a virtual truncation point 130 located at $x_T$ along the pressurized pipe 100*a* to obtain a truncated signal, reverses the truncated signal in time domain to obtain a time-reversed signal, computes an objective function by performing a convolution operation between the time-reversed signal and a preset model response, and estimates defect location based on one or more lobes of the objective function. The computer device 450 may perform a computation based on a comparison between an absolute value of the objective function and a threshold such that lobes of the objective function caused by noise are excluded. In some embodiments, the computer device 450 determines defect type by performing a comparison between an amplitude of a reflected signal and zero. The detect type is identified as a leak if the amplitude is smaller than zero, and identified as a blockage if the amplitude is larger than zero, where reflected signal is a signal of the transient wave reflected by defect.

In some embodiments, the computer device 450 synchronizes itself with an event of generating the transient wave 112. The event causes the transient wave 112 to propagate along the pipe 100*a* along a direction from the downstream node 104 towards the upstream node 102. In one case, the transient wave 112 is produced by a user manually actuating the valve 110 to close the downstream node 104 for a predetermined closing duration. Synchronization between the computer device 450 and the user's action is achievable, for example, when the display 454 provides a user interface for interacting with the user. Synchronization may be accomplished by either the computer device 450 requesting the user to close the downstream node 104, or the user notifying the computer device 450 that the user is about to generate the transient wave 112.

In some cases, a transient generator 414 is optionally provided for generating the transient wave 112. The transient generator 414 may be an actuator detachably installable at the valve 110 for driving the valve 110 to open and close. Although the transient generator 414 may or may not be a member of the defect detection system, it is preferred that the transient generator 414 is controllable by the computer device 450, such that the computer device controls the transient generator 414 to close the downstream node 104 for the predetermined closing duration so as to generate the transient wave 112.

In practical implementation, the computer device 450 may be a desktop computer, a notebook computer, a tablet, a smartphone, or any other computer device or mobile computer device as deemed appropriate by those skilled in the art. Although the computer device 450 is illustrated with a single computer device for performing the aforementioned computing process, the skilled person in the art will appreciate that multiple computer devices or multiple computers networked together may be collectively used to perform the computing process.

The computer device 450 may communicate with the pressure sensor 120 and/or the transient generator 414 via one or more networks 440. The network 440 can include one or more of a cellular network, a public switch telephone network, the Internet, a local area network (LAN), a wide area network (WAN), a metropolitan area network (MAN), a personal area network (PAN), home area network (HAM), and other public and/or private networks. In some embodiments, these devices or systems need not communicate with each other through a network. As one example, these devices or systems can couple together via one or more wires, such as a direct wired-connection. As another example, they can communicate directly with each other through a wireless protocol, such as Bluetooth, near field communication (NFC), or other wireless communication protocol.

The defect detection system may further comprise a server 442 connectable to the computer device 450 through the networks 440 such that computationally intensive tasks of data processing are offloaded from the computer device 450 to the server 442 to perform while the computer device 450 performs various control and communication tasks.

Figure 5:
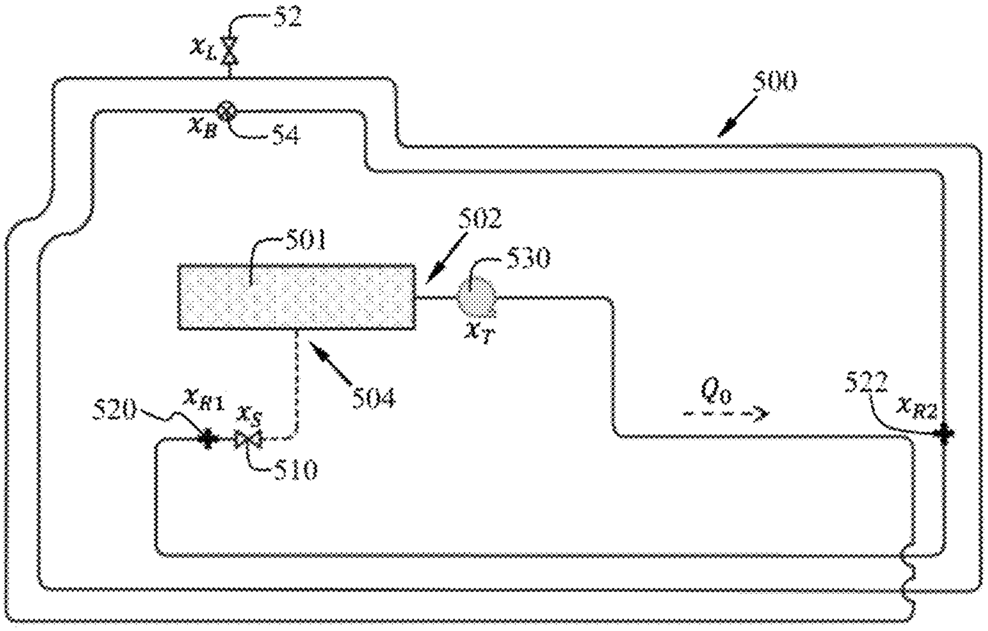
FIG. 5 illustrates a test scheme that demonstrates defect detection according to certain embodiments of the present disclosure.

FIG. 5 illustrates a test scheme that demonstrates defect detection according to certain embodiments of the present disclosure. In this scheme, the proposed technique is applied to a laboratory-scale pipeline system to detect leaks, discrete blockages, or a combination of both types of defects. The test rig is located in the Water Research Resources Laboratory of Hong Kong University of Science and Technology (Clear Water Bay campus). For the pipe 500, the effective pipe length is L=142.09 m, the cross-sectional inner diameter is D=79.2 mm, the wall thickness is e=5.4 mm, the elastic modulus is E=1.47 Gpa. The pipe 500 is connected to the water tank 501 and made of high-density polyethylene (HDPE) material.

A three-stage booster pump 530 (model: KIKAWA KRS16-3) is installed at the upstream end 502 of the pipe 500 to supply water at a constant pressure. A side discharge valve 510 is installed at the downstream end 504 of the pipe 500 to generate transient waves. A leak is simulated using a side-discharge ball valve 52 located at $x_L$=98 m from the downstream end 504. A discrete blockage (DB) is simulated using an in-line gate valve 54 located at $x_B$=44 m from the downstream end 504.

Two pressure sensors 520 and 522 (model: UNIK5000 with a full-scale best fit straight line (BSL)=0.04%) are installed at $x_{R1}$=2.46 m and $x_{R2}$=22.65 m from the downstream valve 510. The pressure sensors 520 and 522 communicate with a data acquisition system (model: Dewesoft IOLITEi-8xLV). The signals are recorded at a sampling frequency of $F_S$=1000 Hz. Two flowmeters (model: DXNP-UHS-NN) are installed near the upstream end 502 and downstream end 504 respectively to estimate the base flow and the leak flow rate in this pipeline system. The two sensors 520 and 522 are used to estimate the experimental wave speed in the system using the wave-arrival time method, while only one sensor (i.e., sensor 520) is used to apply the proposed TR technique as discussed herein according to certain embodiments.

Ten test cases (denoted as C1, C2, . . . , C10 respectively) are considered to demonstrate the efficiency of the developed technique. The test cases and the relevant system parameters are provided in Table 1 below, where both blockages and leak cases are considered. In Table 1, the symbol "+" means coexistence.

TABLE 1

| Test cases and key parameters | | | | | | | | |
|---|---|---|---|---|---|---|---|---|
| Case | Defect (leak/DB) | Steady-state flowrate, $Q_0$ ($ls^{-1}$) | Steady-state pressure head, $H_0$ (m) | Valve time closure, $T_c$ (s) | Measured wave speed, $a_0$ ($ms^{-1}$) | Leak size, $s_L$ ($mm^2$) | Blockage coefficient, $k_{DB}$ | Signal-to-noise ratio, SNR dB |
| 1 | Leak | 0.487 | 20.82 | 0.026 | 356.46 | 142.86 | — | 9.68 |
| 2 | Leak + DB | 0.307 | 23.77 | 0.040 | 358.49 | 98.53 | 3000 | 8.00 |
| 3 | Leak + DB | 0.318 | 25.26 | 0.025 | 357.15 | 73.89 | 3000 | 7.74 |
| 4 | Leak | 0.577 | 27.03 | 0.043 | 359.25 | 133.01 | — | 6.17 |
| 5 | DB | 0.534 | 21.72 | 0.025 | 358.21 | — | 775.89 | 6.15 |
| 6 | Leak + DB | 0.323 | 25.43 | 0.026 | 354.21 | 73.89 | 2200 | 5.81 |
| 7 | DB | 0.324 | 25.67 | 0.028 | 354.69 | — | 2200 | 4.85 |
| 8 | DB | 0.519 | 21.77 | 0.024 | 355.69 | — | 518.72 | 4.69 |
| 9 | Leak | 0.582 | 26.89 | 0.039 | 359.26 | 98.53 | — | 2.38 |
| 10 | Leak | 0.487 | 26.59 | 0.028 | 362.52 | 157.64 | — | 0.26 |

For each test, the valve 510 is initially kept open to establish the steady-state conditions. The same valve is then manually and fully closed to stimulate or inject the transient wave. The valve maneuver time is denoted by $T_c$. In Table 1, the test cases are sorted with respect to SNR. The SNR is defined in dB as $$SNR = 20\log_{10}\left(\frac{\Delta h_{defect}}{\max(\sigma_{max}, |\sigma_{min}|)}\right) \tag{12}$$

where $\Delta h_{defect}$ is the magnitude of the reflected wave from the defect, $\sigma_{max}$ and $\sigma_{min}$ are maximum and minimum levels respectively of local fluctuations in the reflected wave signal. In the case of two defects, $\Delta h_{defect}=\min(\Delta h_{defect,1}, \Delta h_{defect,2})$. Since the incident wave (i.e., the transient wave) is a step-response, all the measured signals are transformed into a pulse-type waveform (see Wang, X., Waqar, M., Yan, H. C., Louati, M., Ghidaoui, M. S., Lee, P. J., Meniconi, S., Brunone, B. & Karney, B. (2020). Pipeline leak localization using matched-field processing incorporating prior information of modeling error. Mechanical Systems and Signal Processing, 143, 106849). The incident pulse is removed from the measured signal. And the signals are truncated at approximately $t=2L/\bar{a}_0$, where $\bar{a}_0$ denotes an averaged value of measured wave speed (see Table 1, column 6), and L is an effective length of the pipe. The resulting signals are flipped in time domain. The vector for defect candidates is defined as $\hat{x}_D=(\Delta\hat{x}_D, 2\Delta\hat{x}_D, \ldots, L-\Delta\hat{x}_D)$. The modeled response is obtained using the closed-form analytical function (as defined in Eq. 3) wherein $q_{in}$ is defined as $$q_{in}(t) = H_J \exp\left(\frac{1}{2}\left(\frac{t-T_c}{\zeta}\right)^2\right); \tag{13}$$

$$\zeta = \sqrt{\frac{-T_c^2}{2\log_{10}(0.001)}}$$

where $H_J=a_0Q_0/(gA)$ is the Joukowsky's pressure head.

Figure 6:
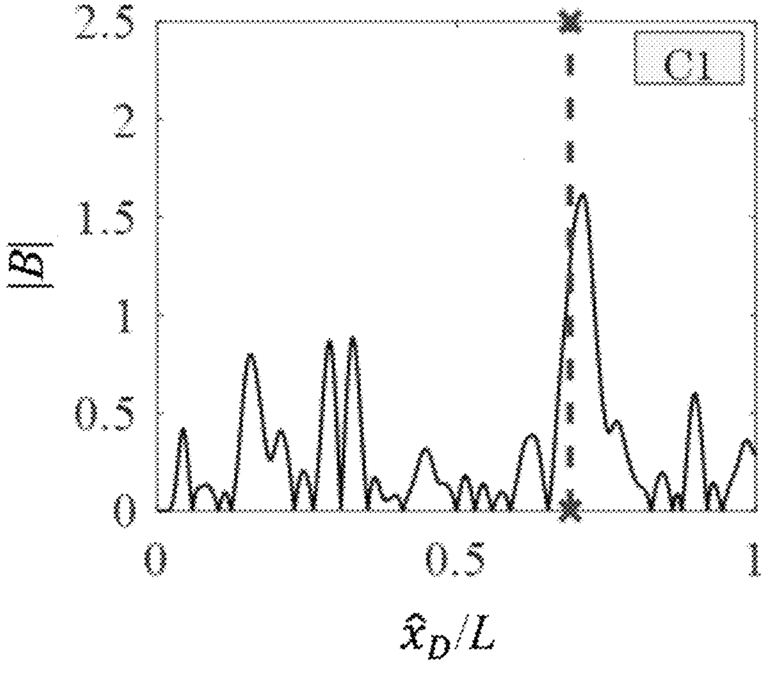
FIG. 6 shows defect localization results for all the test cases C1-C10 in the test scheme of FIG. 5.
Figure 6:
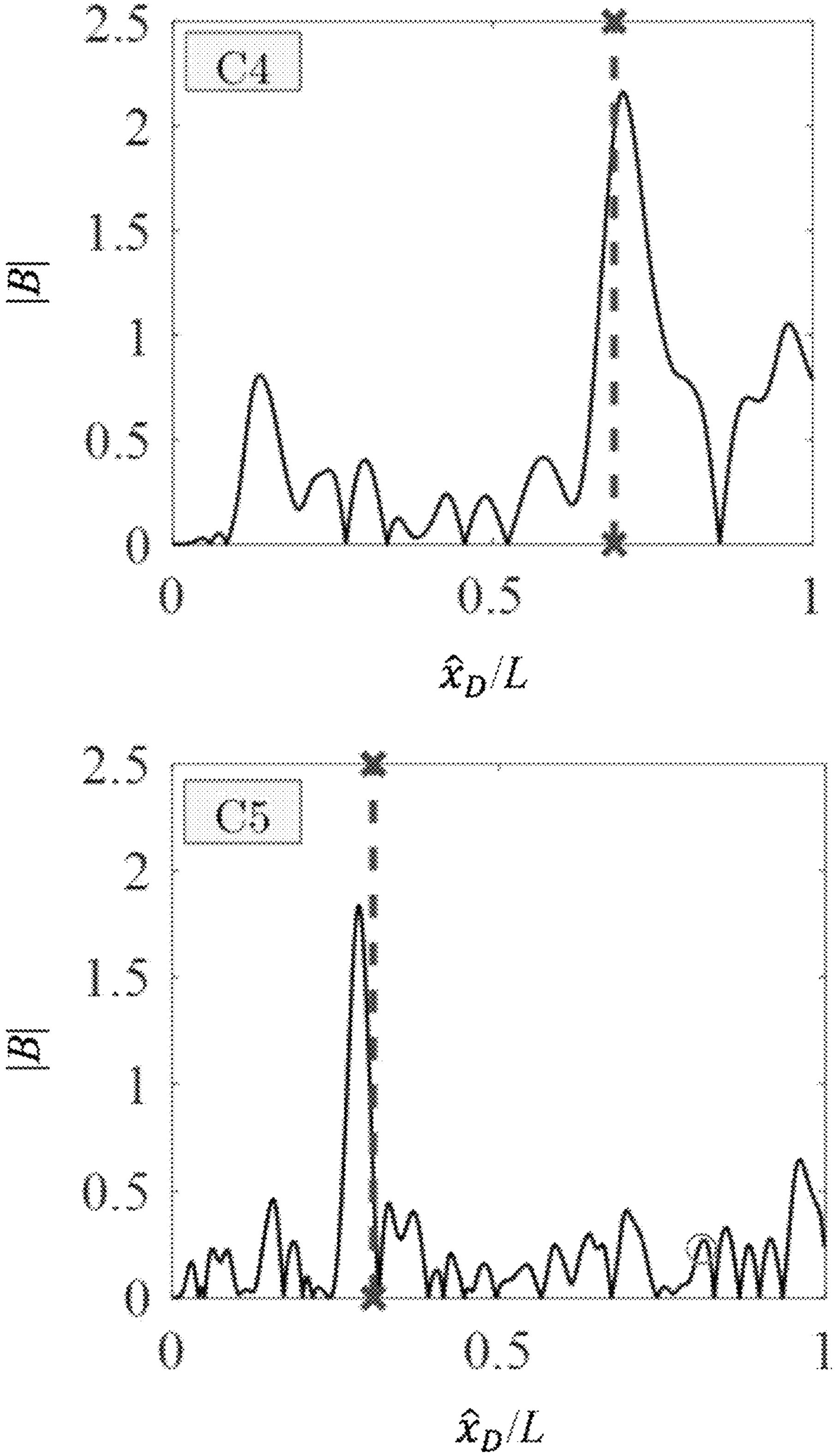
Figure 6:
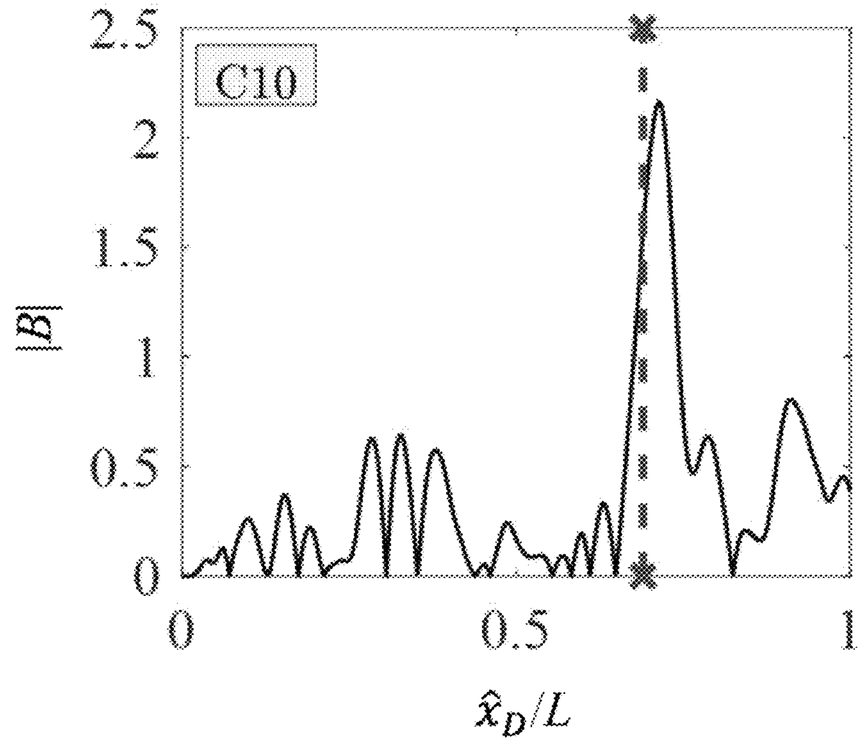

The defect localization results for all the ten test cases are shown in FIG. 6, where the vertical dash lines indicate the exact defect location. As can be seen, for all the cases, the defects can be accurately localized. Even for the C10 where the SNR is as low as 0.26 dB, location of the defect can still be accurately identified. The average absolute defect localization error is around 3.2 m and it is within the expected diffraction limit (i.e., $0.5\lambda_{min}=0.5\bar{a}_0T_c=6.98$ m, where $T_c=24$ ms is used as it is the fastest valve closure among all test cases. The threshold values are found to be ranging between $\gamma=0.7\pm0.33$.

Figure 7:
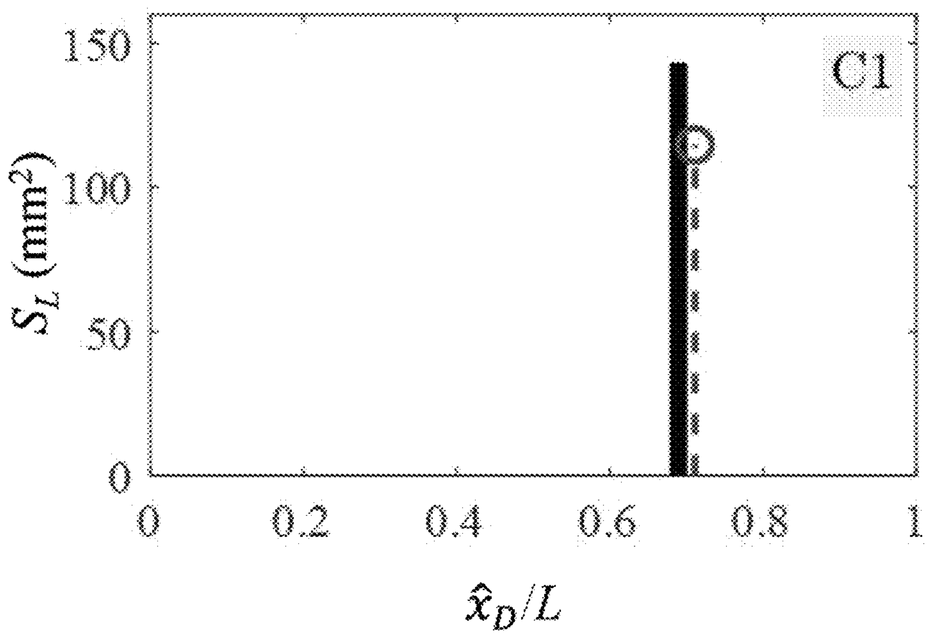
FIG. 7 shows estimated leak location and leak size for the test cases C1-C4, C6, C9, and C10 in the test scheme of FIG. 5.

In terms of defect type classification, all the defects can be correctly classified and their properties can be determined. For the cases (i.e., C1-C4, C6, C9, C10) where the defects include a leak, the estimated leak sizes are shown in FIG. 7. Solid bars represent the exact leak properties (location, size) and dash lines denote the estimated leak properties (location, size). For the cases (i.e., C2, C3, C5-C8) where the defects include a blockage, the estimated blockage coefficients are shown in FIG. 8. The solid bars represent the exact blockage properties (location, blockage coefficient), and the dash lines denote the estimated blockage properties (location, blockage coefficient). The maximum relative error in the estimated size is around 19.6% (for leak cases) and 20.2% (for blockage cases).

FIGS. 9A, 9B, 10 and 11 illustrate a real-field pipeline system and real-leak detection in a tree-type branch network. The pipeline system is located in Hong Kong University of Science and Technology (Clear Water Bay campus) and operated by the Facility Management Office (FMO) of the university. The pipe is buried on a hilly terrain and comprised of a 270 m long ductile iron water main with a nominal diameter of 150 mm and contains two in-line short branches (between 5 m and 18 m) to supply water to the fire sprinkler systems in three residential buildings.

Figure 9A:
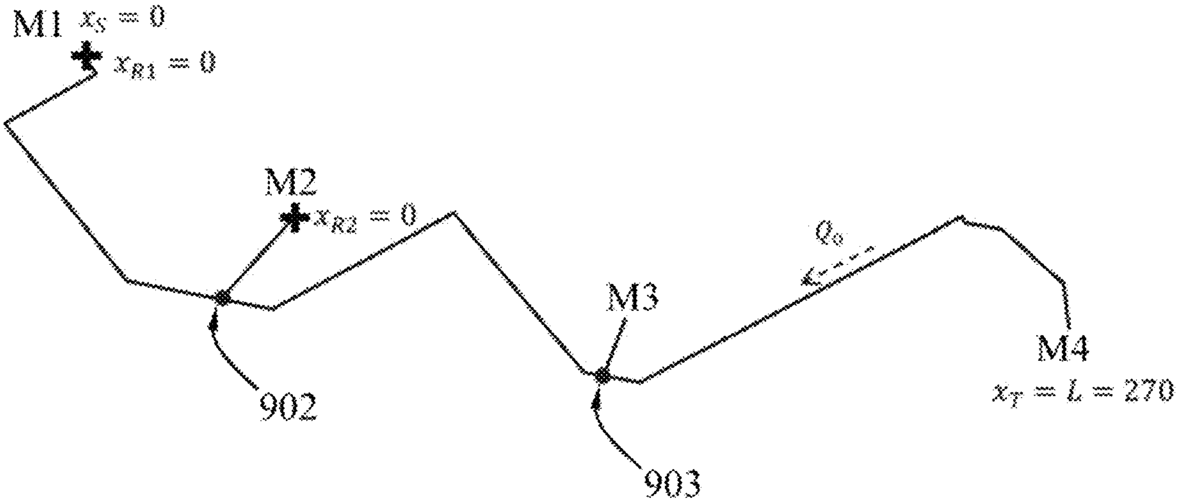
FIG. 9A illustrates a top view of a real-field pipeline system according to certain embodiments of the present disclosure.
Figure 9B:
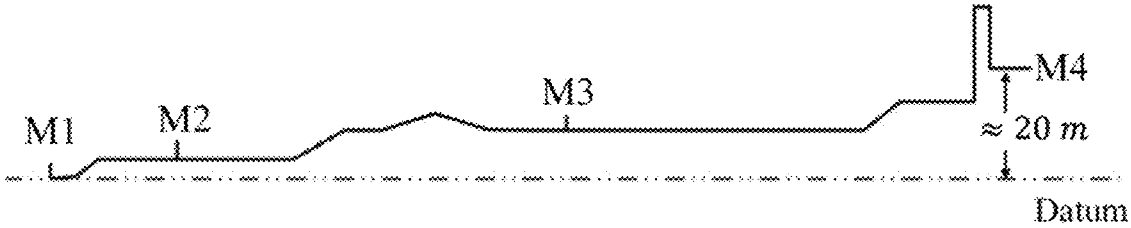
FIG. 9B illustrates an elevation profile of the real-field pipeline system of FIG. 9A.

The topology of the pipeline system and the elevation profile is shown in FIG. 9A (top view) and FIG. 9B (elevation view) respectively. In particular, the upstream node of the main pipe is connected with a pump labelled as M4 and located at $x_T$, while the downstream node (denoted by M1 and located at $x_s=0$) of the main pipe and the downstream nodes (denoted as M2 and M3 respectively) of two side branches are connected with gate valves to isolate the pipeline system from the building fire sprinkler system. Node 902 is an intersection between the main pipe and the side branch with the downstream node M2. Node 903 is an intersection between the main pipe and the other side branch with the downstream node M3. The length of the main pipe is L=270 m, and therefore $x_T=270$ m. The pump station is about 20 m higher in elevation than the gate valves at the node M1. The system was fraught with a leak of around 3 l/s at an unknown location.

Two pressure sensors (model: UNIK5000 with a full-scale best fit straight line (BSL)=0.04%) are installed near M1 and M2. The two sensors are denoted by "+" and located at $x_{R1}$ and $x_{R2}$ respectively. The pressure sensors communicate with a data acquisition system (model: National Instrument cDAQ-9136). The signals are recorded at a sampling frequency of 1000 Hz. Two flowmeters (model: DXNP-UHS-NN) are respectively installed near the upstream end and downstream end of the main pipe to estimate the base flow and the leak flow rate in the system. The two sensors are used to estimate the experimental wave speed in the system using the wave-arrival time method, while only one sensor (the one located at M1) is used to apply the proposed TR technique as described above according to one or more embodiments. To conduct transient experiments, the system is isolated from the buildings through gate valves and the pump is operated at a constant rate to feed the main pipe and side branches. A side-discharge ball valve is installed near M1 to regulate the pre-transient flow rate in the system as well as to generate the transient wave. The pre-transient flow rate at the transient generation valve is about $Q_0$=0.6 l/s and the valve time closure is $T_c$=140 milliseconds.

Figure 10:
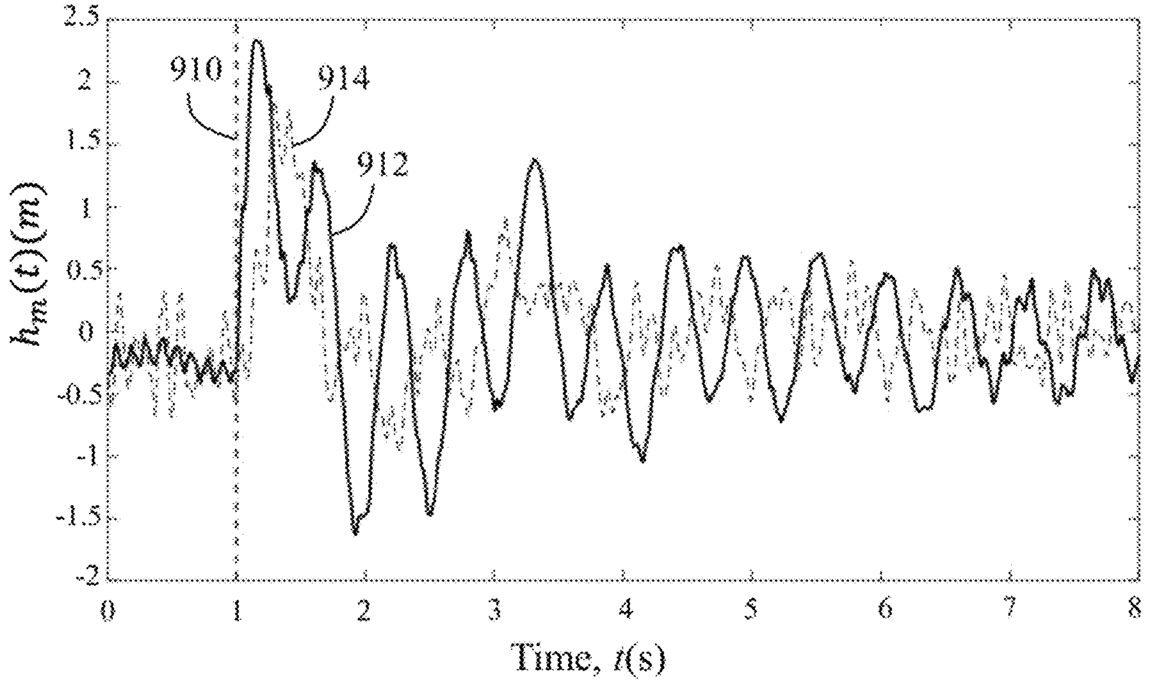
FIG. 10 shows signals recorded respectively by two pressure sensors located at $x_{R1}$ and $x_{R2}$ respectively as shown in FIG. 9A.

FIG. 10 shows the signals 912 and 914 recorded respectively by the two pressure sensors located at $x_{R1}$ and $x_{R2}$ respectively. Line 910 indicates the starting time of the transient wave, i.e., 1 s in this case. Based on the wave-arrival time approach, the wave speed is found to be $\overline{a_0}$=918.5 m/s given that the distance between $x_{R1}$ and $x_{R2}$ is 84.5 m. The valve time closure is estimated to be 150 milliseconds, and thus the maximum achievable resolution is $0.5\lambda_{min}=0.5\overline{a_0}T_c$=68.85 m. Since the input signal is a step response, the signal recorded at $x_{R1}$ is transformed into a pulse response. The resulting signal is provided as an input to Algorithm 310.

Figure 11:
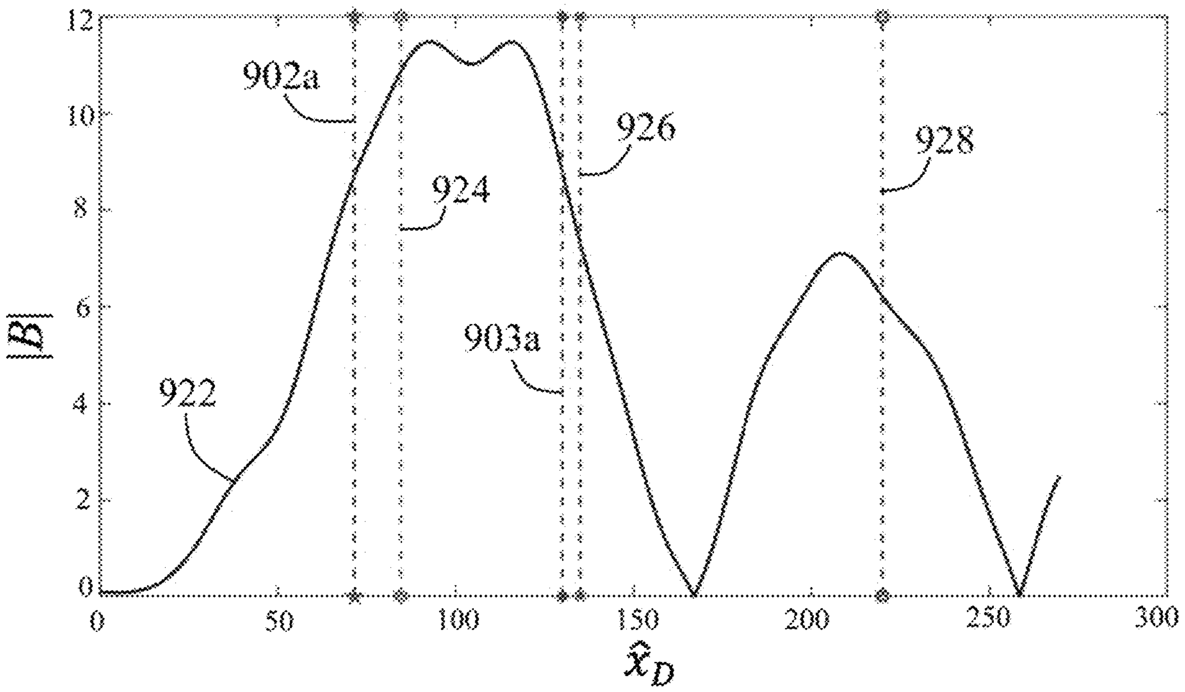
FIG. 11 shows the identified defect localization for the real-field pipeline system of FIG. 9A.

The defect localization results are shown in FIG. 11. Curve 922 denotes the objective function, lines 902*a*, 924, 903*a*, and 926 denote locations of node 902, M2, node 903, and M3. Line 928 denotes the real leak location. The curve 922 show two distinct lobes. The first one at $\hat{x}_D \in [50, 150]$ and the second one at $\hat{x}_D \in [167, 260]$. The width of the former lobe is clearly larger, which indicates the cluster of known system boundary conditions (i.e., nodes 902 and 903, and dead ends at M2 and M3), while the latter lobe does not correspond to any known feature of the pipeline; and thus, following Eq. (7), denotes the location of the identified leak. Indeed, following this analysis, the real leak is found to be at $\hat{x}_D$=220 m from the downstream valve and the absolute localization error is 12 m, which is within the theoretical diffraction limit of waves. In this case, the defect type and its size are known a priori because, when the system is isolated from the buildings, pressurized and at rest, the pressure is found to be dropping continuously and a flow of about 3 l/s is estimated to be escaping from the pipeline system. Therefore, Algorithm 320 is no longer needed. This real world example demonstrates the effectiveness of the TR-based technique as described herein.

As used herein, the term "pressurized pipe" means the pipe is pressurized with fluid, such as water. That is, there is fluid flowing within the pipe.

It will further be appreciated that any of the features in the above embodiments of the present disclosure may be combined together and are not necessarily applied in isolation from each other. Similar combinations of two or more features from the above described embodiments or preferred forms of the present disclosure can be readily made by one skilled in the art.

Unless otherwise defined, the technical and scientific terms used herein have the plain meanings as commonly understood by those skill in the art to which the example embodiments pertain. Embodiments are illustrated in non-limiting examples. Based on the above disclosed embodiments, various modifications that can be conceived of by those skilled in the art would fall within spirits of the example embodiments.

What is claimed is:

1. A method of defect detection for a pressurized pipe having an upstream node and a downstream node, the method comprising:

generating, by a wave source located at $x_S$ at the downstream node, a transient wave travelling in a direction from the downstream node towards the upstream node, wherein generating the transient wave comprises closing the downstream node for a predetermined closing duration to generate the transient wave;

measuring, by a pressure sensor located at $x_R$ upstream of the wave source, a transient response caused by the transient wave to obtain a measured signal; and processing, by a computer device to execute a time-reversal (TR) algorithm, the measured signal for determining one or more defects of the pressurized pipe, wherein processing the measured signal comprises: truncating, by the computer device, the measured signal at a virtual truncation point located at x-along the pressurized pipe to obtain a truncated signal, wherein truncating the measured signal comprises:

truncating the measured signal at a time $t=2x_T/a_0$, wherein $a_0$ denotes wave speed; or truncating the measured signal at a time $t=2L/\overline{a_0}$, wherein $\overline{a_0}$ denotes an averaged value of measured wave speed, and L is an effective length of the pipe.

2. The method of claim 1, wherein processing the measured signal comprises:

reversing the truncated signal in time domain to obtain a time-reversed signal; and computing an objective function by performing a convolution operation between the time-reversed signal and a preset model response.

3. The method of claim 2, wherein the truncated signal is denoted as $\Delta h_m(t_R)$, and wherein processing the measured signal comprises:

reversing $\Delta h_m(t_R)$ in time domain to obtain $\Delta h_m(-t_R)$; and computing the objective function given by $$B(\hat{x}_D) = \left[\frac{g_C(t_R, \hat{x}_D)}{\|g_C(t_R, \hat{x}_D)\|} * \Delta h_m(-t_R, x_D)\right]_{t_R=0}$$

where $t_R$ is a variable and $t_R \in [0, 2x_T/a_0]$;

$a_0$ denotes wave speed;

$\hat{X}_D=(\Delta\hat{x}_D, 2\Delta\hat{x}_D, \ldots, x_T)$ is a vector for potential defect locations;

$\Delta\hat{x}_D \leq 0.5\lambda_{min}$;

$\lambda_{min}=a_0/f_{max}$;

$f_{max}$ is a maximum frequency of the transient wave;

$x_D$ is a true vector for defect locations;

$g_c(t_R, \hat{x}_D)$ is the preset model response;

* denotes a convolution operator;

$[\bullet]_{t_R=0}$ represents a function $[\bullet]$ evaluated at $t_R$=0; and $\|\bullet\|$ represents Euclidean norm of a function.

4. The method of claim 3, wherein $$a_0=\left(\frac{\rho}{K}+(1-\nu^2)\frac{\rho D}{eE}\right)^{-1/2},$$

where: ρ is density of fluid;

K is bulk modulus of the fluid;

v is Poisson's ratio;

D is inner diameter of the pipe;

e is thickness of pipe wall; and

E is modulus of elasticity of the pipe.

5. The method of claim 3, wherein $g_c(t_R, \hat{x}_D)=q_{in}(t_R)*G(t_R, \hat{x}_D)$, where $q_{in}(t_R)$ is a non-dimensional pulse-type function; and $G(t_R, \hat{x}_D)$ is a propagation function.

6. The method of claim 5, wherein $$q_{in}(t_R)=H_J\exp\left(\frac{1}{2}\left(\frac{t_R-T_c}{\zeta}\right)^2\right),$$

where $$\zeta=\sqrt{\frac{T_c^2}{2\ln(0.001)}},$$

where $H_J=a_0Q_0/(gA)$;

$Q_0$ is flowrate of fluid within the pipe;

g is gravitational acceleration constant;

A is a cross-sectional area of the pipe; and $T_c$ is time when the wave source is operated to generate the transient wave.

7. The method of claim 3, wherein $F[G(t_R, \hat{x}_D)](\omega)=\tilde{G}(\omega, \hat{x}_D)=\exp(-2ik(\hat{x}_D-x_S))\exp(ik(x_R-x_S))$, where F[•](ω) denotes Fourier transform operator;

$\tilde{G}(\omega)$ is Fourier transform of $G(t_R)$ from time domain to frequency domain;

i is imaginary number; and k is wavenumber given by $$k=\sqrt{\frac{\omega^2}{a_{ve}^2}-\frac{i\omega}{a_{ve}^2}R+\frac{\omega^2}{a_{ve}^2}\hat{R}(\omega)},$$

where:

$a_{ve}$ is frequency-dependent wave speed;

$R=f_{DW}Q_0/(DA)$;

$f_{DW}$ is Darcy-Weisbach friction factor;

$Q_0$ is flowrate of fluid within the pipe;

D is inner diameter of the pipe;

A is a cross-sectional area of the pipe; and $\hat{R}(\omega)$ is a frequency-dependent wall shear stress model.

8. The method of claim 3, wherein processing the measured signal comprises identifying defect location by computing $$\hat{x}_D=\underset{\hat{x}_D}{\arg\max}\,B(\hat{x}_D):=\{|B(\hat{x}_D)|>\gamma\,|\,\hat{x}_D\in\hat{X}_D,\hat{x}_D\notin\Omega_{BC}\}$$

where $$\gamma=\max\left(\left[n(t_R)\otimes\frac{g_C(t_R,\hat{x}_D)}{\|g_C(t_R,\hat{x}_D)\|}\right](t_R=0)\right);$$

-continued $$[n\otimes g](t_R=0)$$

denotes cross-correlation between n and g evaluated at $t_R=0$;

$\Omega_{BC}$ denotes a set of known locations of boundaries.

9. The method of claim 8, wherein processing the measured signal comprises:

identifying defect type by computing $$\hat{A}_D(\hat{x}_D)=\frac{\langle\tilde{g}_C(\omega,\hat{x}_D),\Delta\tilde{h}_m(\omega,x_D,A_D)\rangle}{\langle\tilde{g}_C(\omega,\hat{x}_D),\tilde{g}_C(\omega,\hat{x}_D)\rangle},$$

identifying defect type as a local damper if $\hat{A}_D(\hat{x}_D)>0$; and identifying defect type as a local relief point if $\hat{A}_D(\hat{x}_D)<0$, where $\tilde{g}_C(\omega)$ is Fourier transform of $g_C(t_R)$, (•,•) denotes an inner product between two vectors, $\hat{A}_D$ is an estimate of $A_D$, and $\Delta h_m(\omega)$ is Fourier transform of $\Delta h_m(t_R)$.

10. The method of claim 9, wherein processing the measured signal comprises:

if $\hat{A}_D(\hat{x}_D)>0$, computing coefficient $$\hat{k}_B=\frac{2gA^2a_0\hat{A}_D}{Q_0(a_0\tilde{q}_S-gA\hat{A}_D)};$$

and if $\hat{A}_D(\hat{x}_D)<0$, computing an area of the local relief point as $$\hat{s}_L=\frac{4\hat{A}_D(gA)^2}{a_0(a_0\tilde{q}_S-gA\hat{A}_D)}\sqrt{\frac{H_0(\hat{x}_D)}{2g}},$$

where g is gravitational acceleration constant;

A is a cross-sectional area of the pipe;

$Q_0$ is flowrate of fluid within the pipe;

$\tilde{q}_S=1$;

$H_0(\hat{x}_D)$ is steady-state pressure head at location $\hat{x}_D$.

11. The method of claim 10, wherein $$H_0(\hat{x}_D)=H_0(x_R)+\hat{x}_D\frac{RQ_0}{2gA},$$

where $H_0(x_R)$ is steady-state pressure head at the location $x_R$.

12. A system of defect detection for a pressurized pipe having an upstream node and a downstream node, a wave source being located at $x_S$ at the downstream node and configured to generate a transient wave travelling in a direction from the downstream node towards the upstream node, the system comprising:

a transient generator configured to actuate the wave source such that the downstream node is closed for a predetermined closing duration to generate the transient wave;

a pressure sensor located at $x_R$ upstream of the wave source and configured to measure the transient wave to obtain a measured signal; and a computer device configured to control the pressure sensor and the transient generator and to execute a process comprising:

controlling the transient generator to actuate the wave source such that the downstream node is closed for the predetermined closing duration to generate the transient wave;

receiving the measured signal from the pressure sensor;

truncating the measured signal at a truncation point located at $x_T$ along the pressurized pipe to obtain a truncated signal denoted as $\Delta h_m(t_R)$;

reversing the truncated signal in time domain to obtain a time-reversed signal denoted as $\Delta h_m(-t_R)$;

computing an objective function given by $$B(\hat{x}_D) = \left[\frac{g_C(t_R, \hat{x}_D)}{\|g_C(t_R, \hat{x}_D)\|} * \Delta h_m(-t_R, x_D)\right]_{t_R=0};$$

and determining defect location by computing $$\hat{x}_D = \underset{\hat{x}_D}{\arg\max}\, B(\hat{x}_D) := \left\{|B(\hat{x}_D)| > \gamma \,\middle|\, \hat{x}_D \in \hat{X}_D,\ \hat{x}_D \notin \Omega_{BC}\right\}$$

where $t_R$ is a variable and $t_R \in [0, 2x_T/a_0]$;

$a_0$ denotes wave speed;

$\hat{X}_D = (\Delta\hat{x}_D, 2\Delta\hat{x}_D, \ldots, x_T)$ is a vector for potential defect locations;

$\Delta\hat{x}_D \leq 0.5\lambda_{min}$;

$\lambda_{min} = a_0/f_{max}$;

$f_{max}$ is a maximal frequency of the transient wave;

$x_D$ is a true vector of defect locations;

$g_C(t_R, \hat{x}_D)$ is a preset model response;

* represents a convolution operator;

$[\bullet]_{t_R=0}$ represents a function $[\bullet]$ evaluated at $t_R=0$;

$\|\bullet\|$ represents Euclidean norm of a function;

$$\gamma = \max\left(\left[n(t_R) \otimes \frac{g_C(t_R, \hat{x}_D)}{\|g_C(t_R, \hat{x}_D)\|}\right](t_R = 0)\right);$$

$$[n \otimes g](t_R = 0)$$

denotes cross-correlation between n and g evaluated at $t_R=0$; and $\Omega_{BC}$ denotes a set of known locations of boundaries.

13. The system of claim 12, wherein the process further comprises:

identifying defect type by computing $$\hat{A}_D(\hat{x}_D) = \frac{\left\langle \tilde{g}_C(\omega, \hat{x}_D), \Delta\tilde{h}_m(\omega, x_D, A_D)\right\rangle}{\left\langle \tilde{g}_C(\omega, \hat{x}_D), \tilde{g}_C(\omega, \hat{x}_D)\right\rangle};$$

identifying defect type as a local damper if $\hat{A}_D(\hat{x}_D) > 0$; and identifying defect type as a local relief point if $\hat{A}_D(\hat{x}_D) < 0$, where $\tilde{g}_C(\omega)$ is Fourier transform of $g_C(t_R)$, $\langle\bullet, \bullet\rangle$ denotes an inner product between two vectors, $\hat{A}_D$ is an estimate of $A_D$, and $\Delta h_m(\omega)$ is Fourier transform of $\Delta h_m(t_R)$.

14. A computer-implemented method of defect detection for a pressurized pipe having an upstream node and a downstream node, a wave source being located at $x_S$ at the downstream node and configured to generate a transient wave travelling in a direction from the downstream node towards the upstream node, a pressure sensor located at $x_R$ upstream of the wave source and configured to measure the transient wave to obtain a measured signal, the method comprising:

controlling, by a computer device, a transient generator to actuate the wave source such that the downstream node is closed for a predetermined closing duration to generate the transient wave;

receiving, by the computer device from the pressure sensor, the measured signal representing a transient response caused by the transient wave measured by the pressure sensor;

truncating the measured signal at a virtual truncation point located at $x_T$ along the pressurized pipe to obtain a truncated signal;

reversing the truncated signal in time domain to obtain a time-reversed signal;

computing an objective function by performing a convolution operation between the time-reversed signal and a preset model response;

performing a computation based on a comparison between an absolute value of the objective function and a threshold such that lobes of the objective function caused by noise are excluded; and estimating defect location based on one or more lobes of the objective function.

15. The method of claim 14, further comprising:

determining defect type by performing a comparison between an amplitude of a reflected signal and zero;

identifying the defect type as a leak if the amplitude is smaller than zero; and identifying the defect type as a blockage if the amplitude is larger than zero, wherein the reflected signal is a signal of the transient wave reflected by defect.

* * * * *